(12) United States Patent
Smits et al.

(10) Patent No.: US 12,295,374 B2
(45) Date of Patent: May 13, 2025

(54) INTESTINAL TRACT PART PROCESSING DEVICE AND METHOD

(71) Applicant: Van Hessen Holding B.V., Nieuwerkerk Aan Den Ijssel (NL)

(72) Inventors: Jürgen Johannes Antonius Thomas Smits, Nieuwerkerk Aan Den Ijssel (NL); Johannes Wilhelmus Cornelisse, Nieuwerkerk Aan Den Ijssel (NL); Gerrit Strookappe, Nieuwerkerk Aan Den Ijssel (NL)

(73) Assignee: Van Hessen Holding B.V., Nieuwerkerk Aan Den Ijssel (NL)

( * ) Notice: Subject to any disclaimer, the term of this patent is extended or adjusted under 35 U.S.C. 154(b) by 0 days.

(21) Appl. No.: 18/562,451

(22) PCT Filed: Jun. 1, 2022

(86) PCT No.: PCT/EP2022/064849
§ 371 (c)(1),
(2) Date: Nov. 20, 2023

(87) PCT Pub. No.: WO2022/253871
PCT Pub. Date: Dec. 8, 2022

(65) Prior Publication Data
US 2024/0260593 A1 Aug. 8, 2024

(30) Foreign Application Priority Data

Jun. 1, 2021 (NL) ..................................... 2028349

(51) Int. Cl.
*A22C 13/00* (2006.01)
*A22C 13/02* (2006.01)
*A22C 17/14* (2006.01)

(52) U.S. Cl.
CPC ............ *A22C 13/023* (2013.01); *A22C 17/14* (2013.01)

(58) Field of Classification Search
CPC ........ A22C 13/023; A22C 17/14; A22C 17/16
(Continued)

(56) References Cited

U.S. PATENT DOCUMENTS 4,070,040 A * 1/1978 Igeta ........................ B60R 22/06
297/469
4,363,819 A * 12/1982 Steffen .................... A22C 13/00
426/414
(Continued)

FOREIGN PATENT DOCUMENTS

CH         516 281 A      12/1971
DE       1 047 662 B      12/1958
(Continued)

*Primary Examiner* — Richard T Price, Jr.
(74) *Attorney, Agent, or Firm* — Hoffmann & Baron, LLP

(57) ABSTRACT

An intestinal tract part processing device includes a carrier for holding the intestinal tract part on the carrier at a first end of the intestinal tract part, and an elongate support member having a longitudinal axis configured for supporting the intestinal tract part on an inside of the intestinal tract part. The support member includes an outer wall and an inner wall, at least one fluid chamber arranged therein between, and a primary fluid connection configured for supplying a fluid to the at least one fluid chamber and/or for discharging a fluid from the at least one fluid chamber. The carrier and the support member are movable relative to each other in a direction parallel to the longitudinal axis. The carrier includes a tubular carrying member which is arranged coaxially to the support member on an outer side of the support member.

44 Claims, 25 Drawing Sheets

(58) Field of Classification Search
USPC .......................................................... 452/30
See application file for complete search history.

(56) References Cited

U.S. PATENT DOCUMENTS

| | | | | |
|---|---|---|---|---|
| 5,820,453 A | * | 10/1998 | Burke .................... | A22C 17/16 |
| | | | | 452/173 |
| 2012/0308316 A1 | * | 12/2012 | Stousland .............. | B65G 53/30 |
| | | | | 406/194 |

FOREIGN PATENT DOCUMENTS

| | | |
|---|---|---|
| DE | 100 01 708 A1 | 7/2001 |
| EP | 0 873 689 B1 | 1/2003 |
| JP | 3694792 B2 | 9/2005 |

* cited by examiner

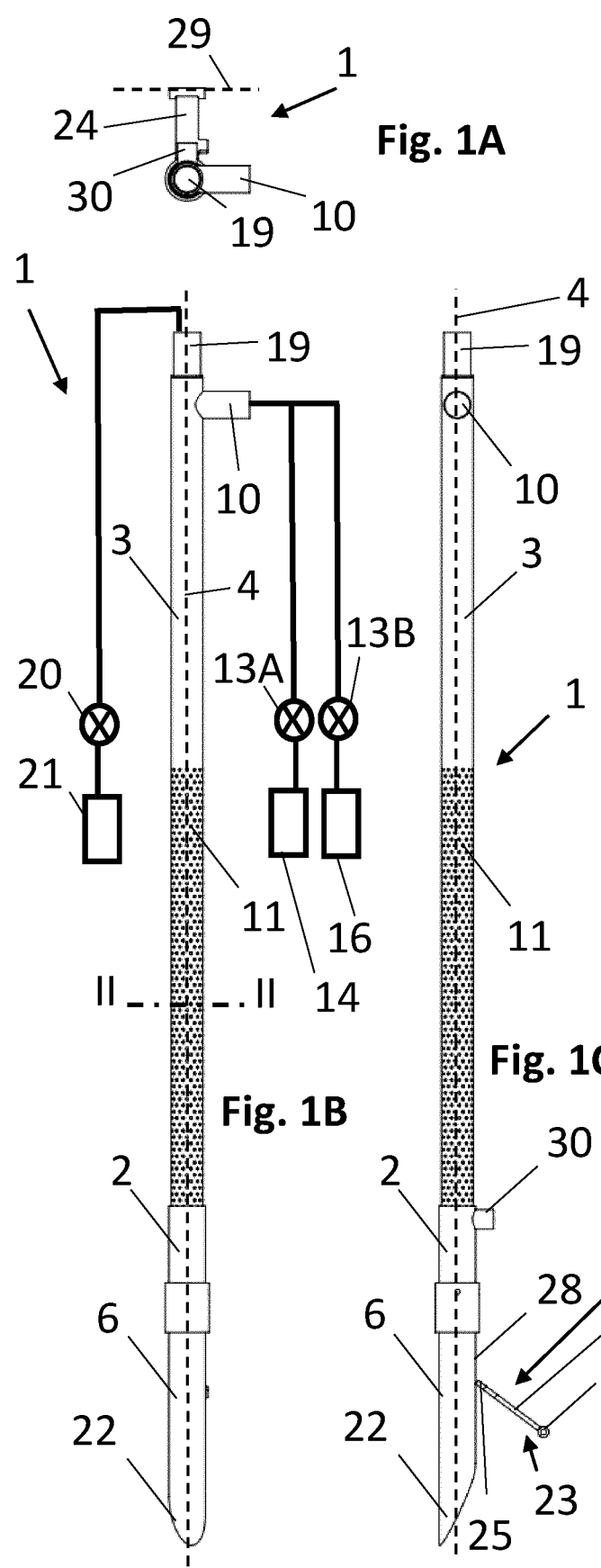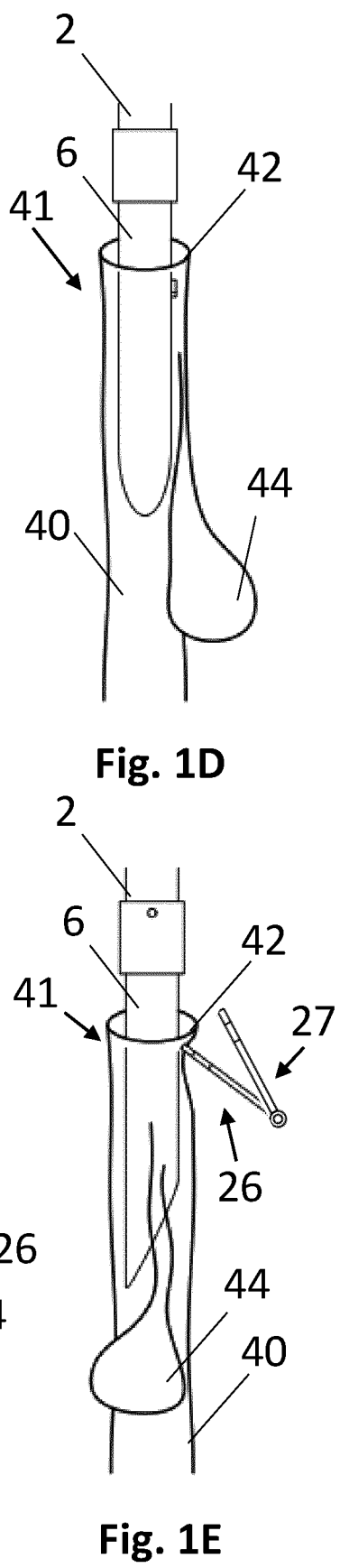
Fig. 1A
Fig. 1B
Fig. 1C
Fig. 1D
Fig. 1E

A – A

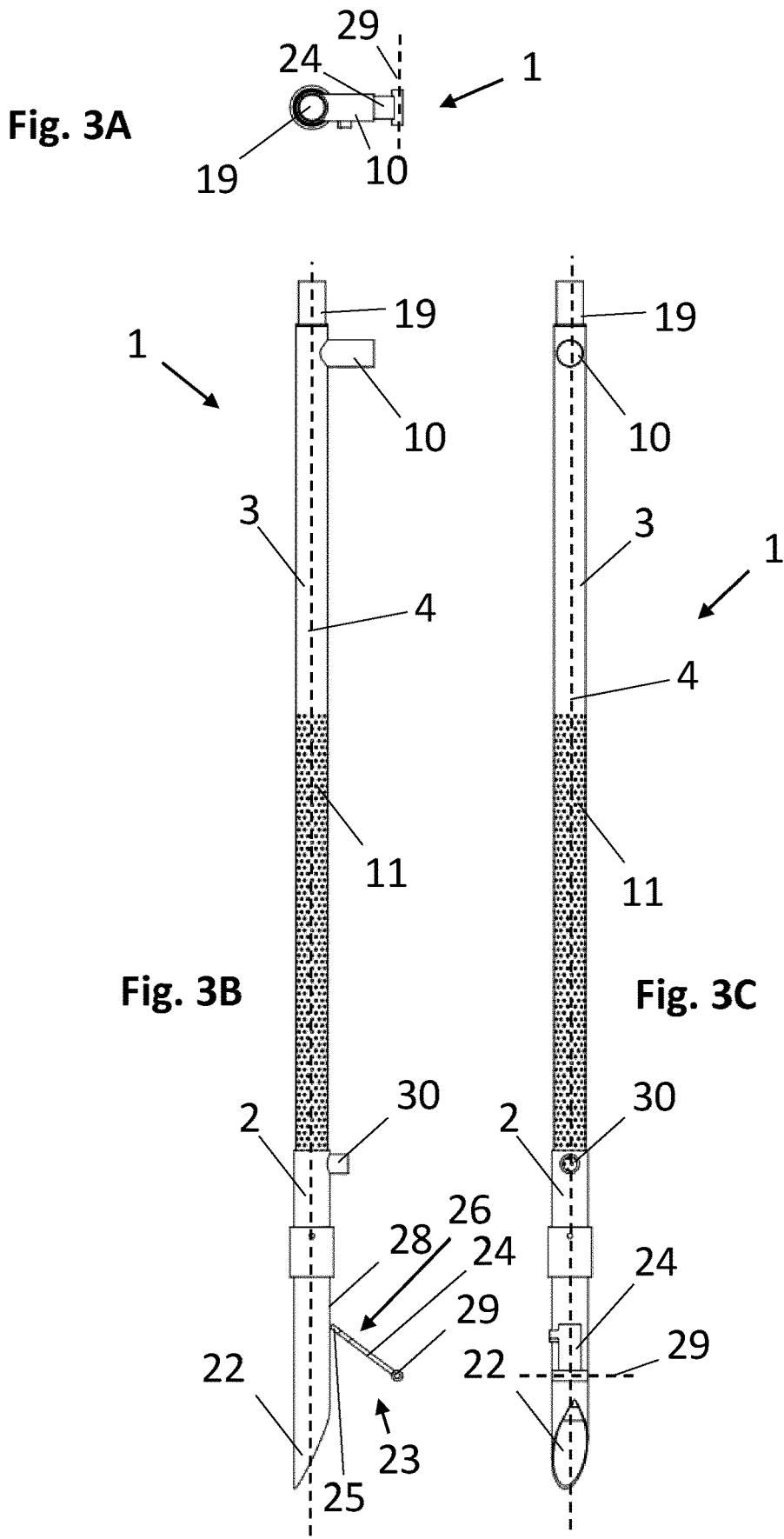

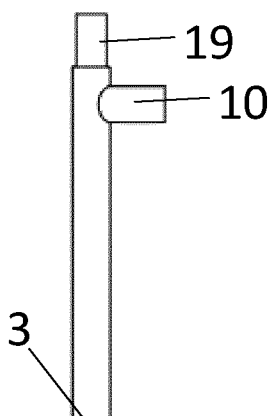
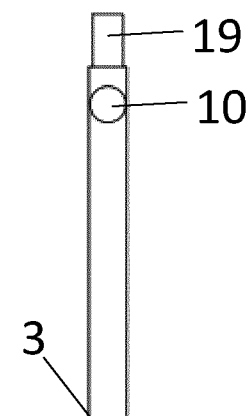
Fig. 3D
Fig. 3E

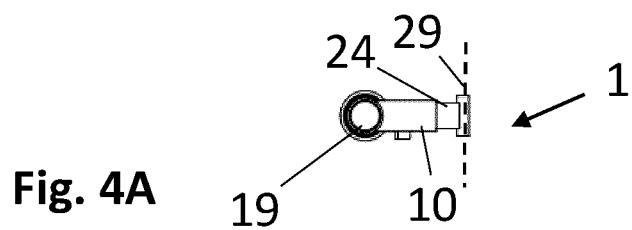
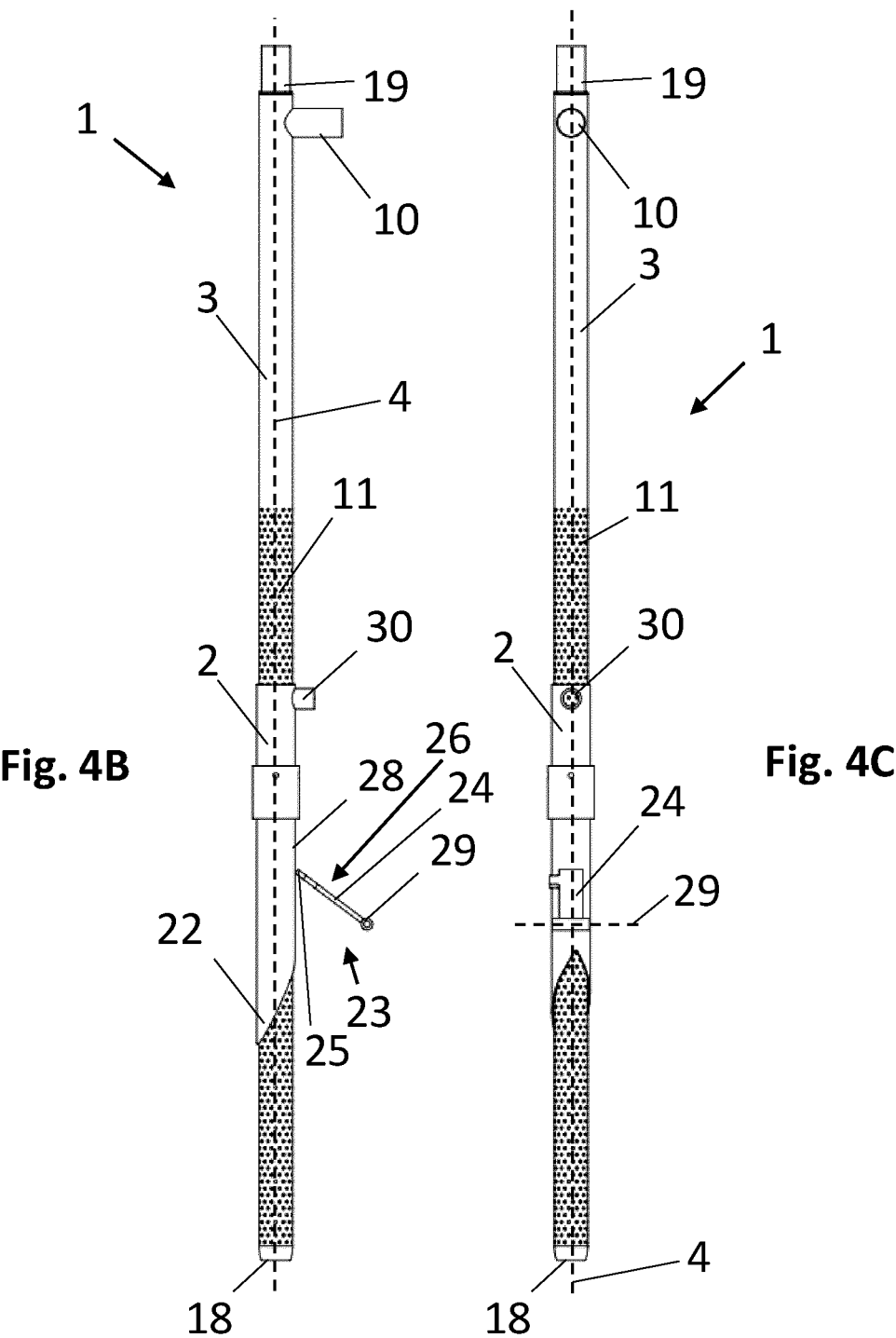
Fig. 4A
Fig. 4B
Fig. 4C

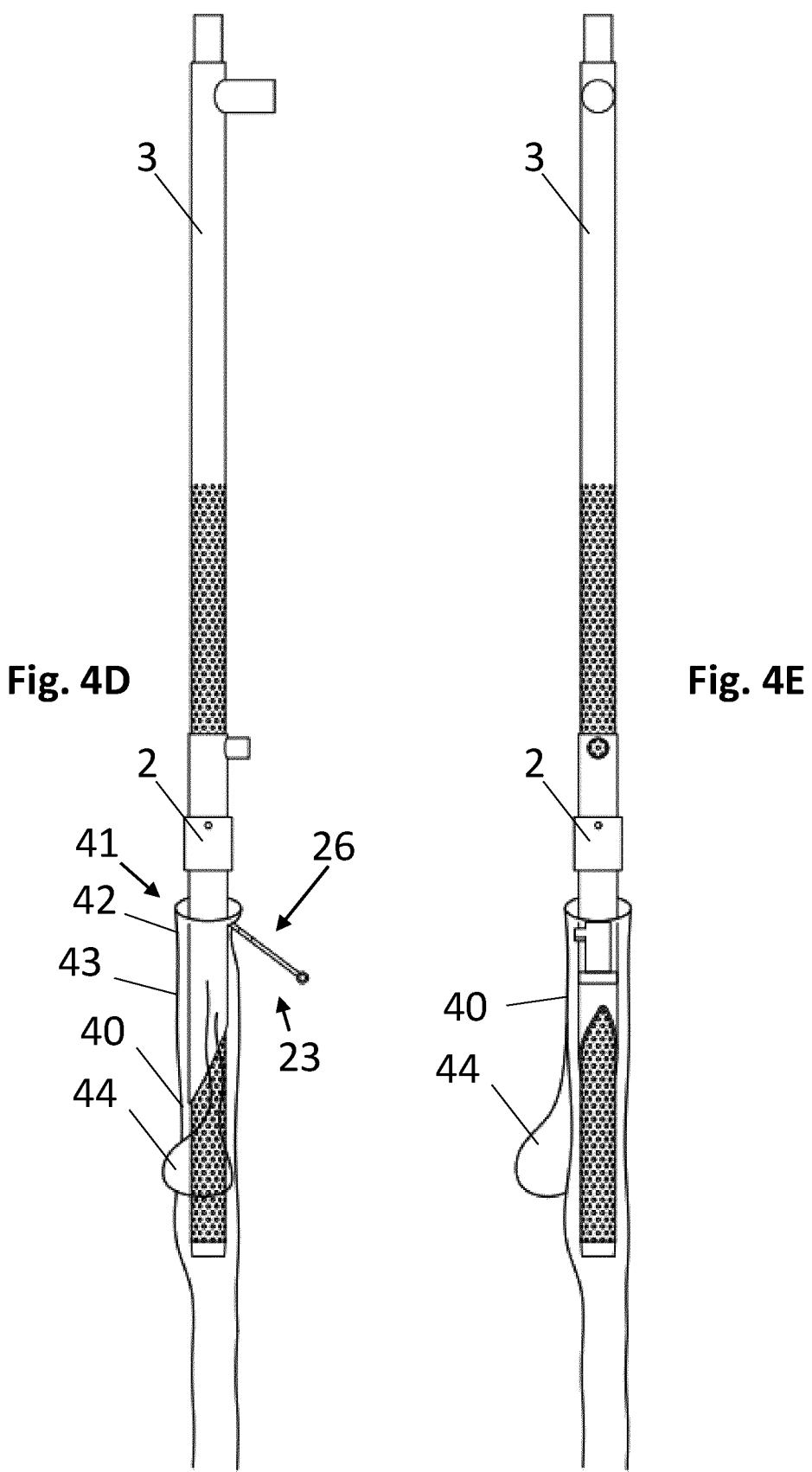

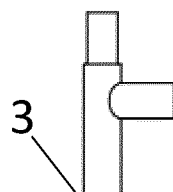
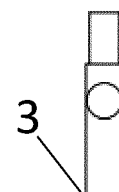

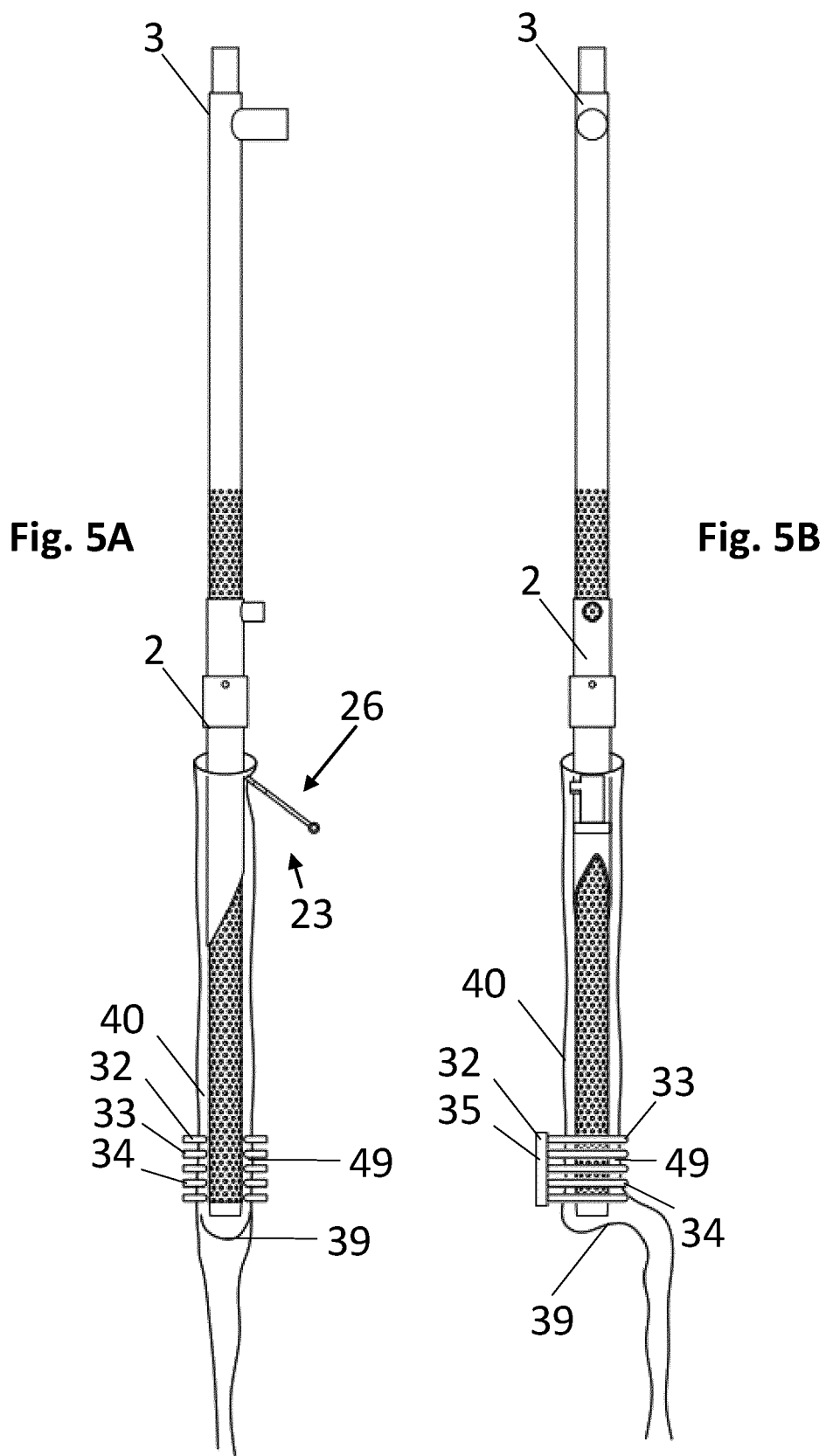

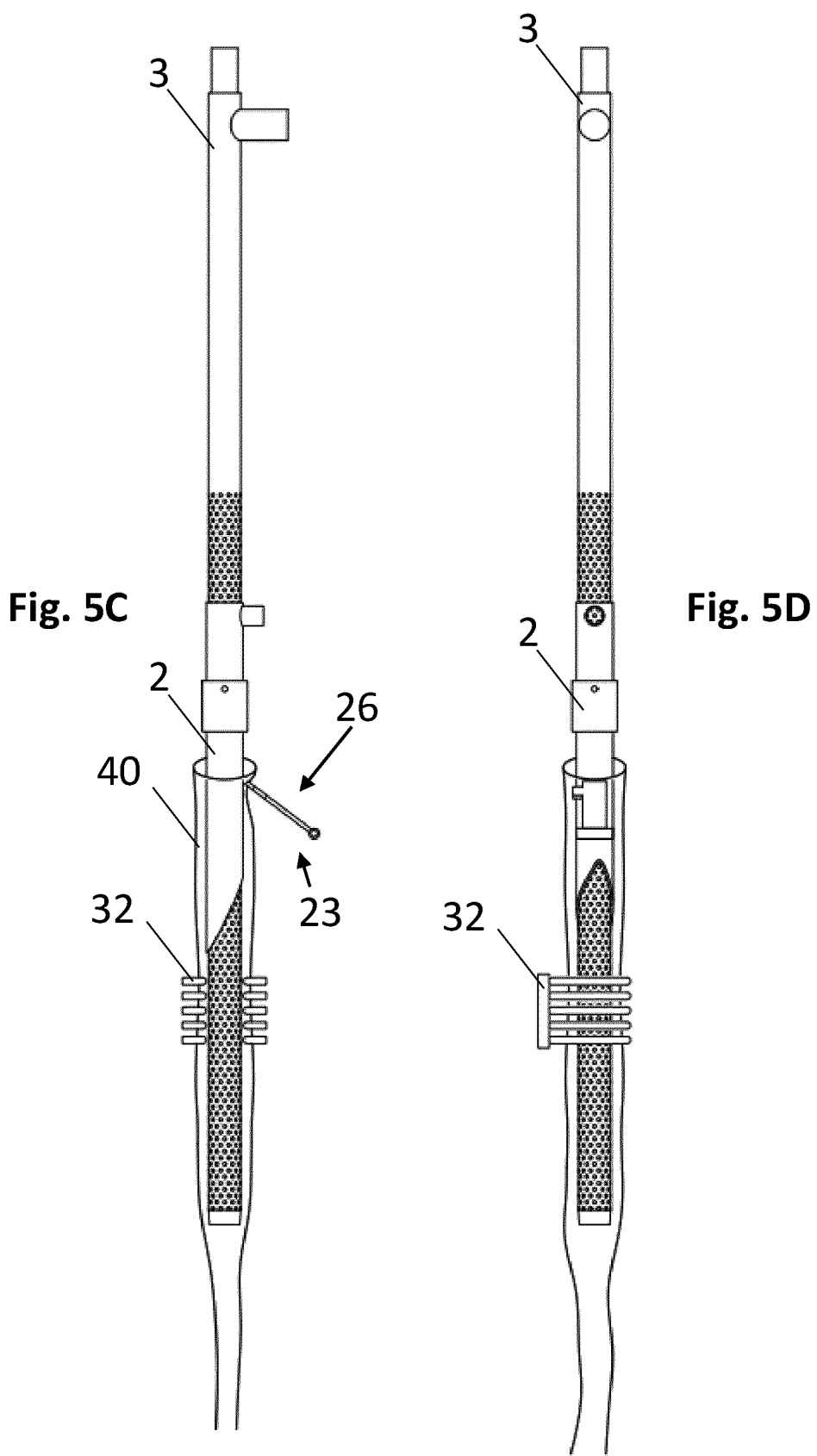

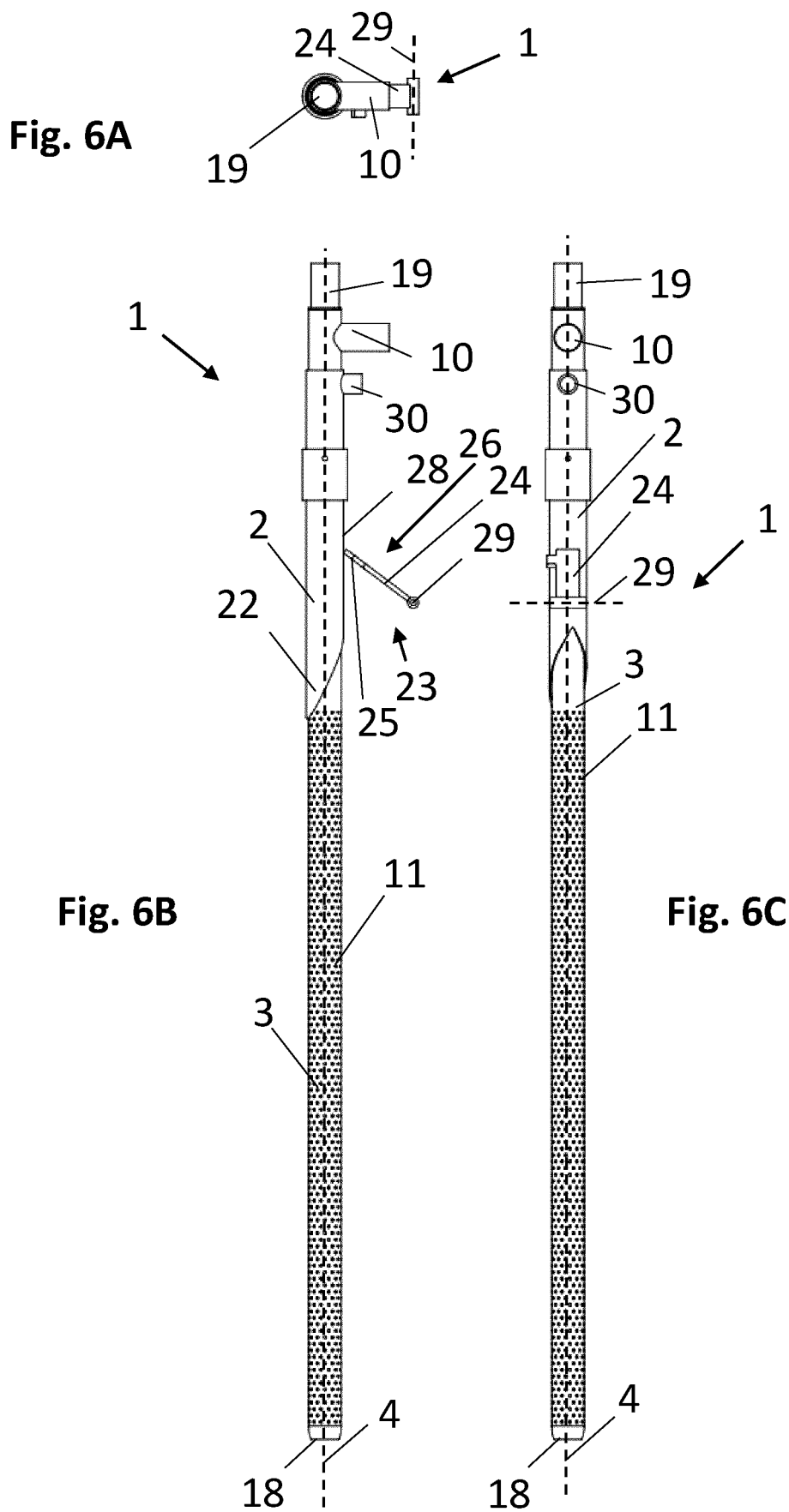

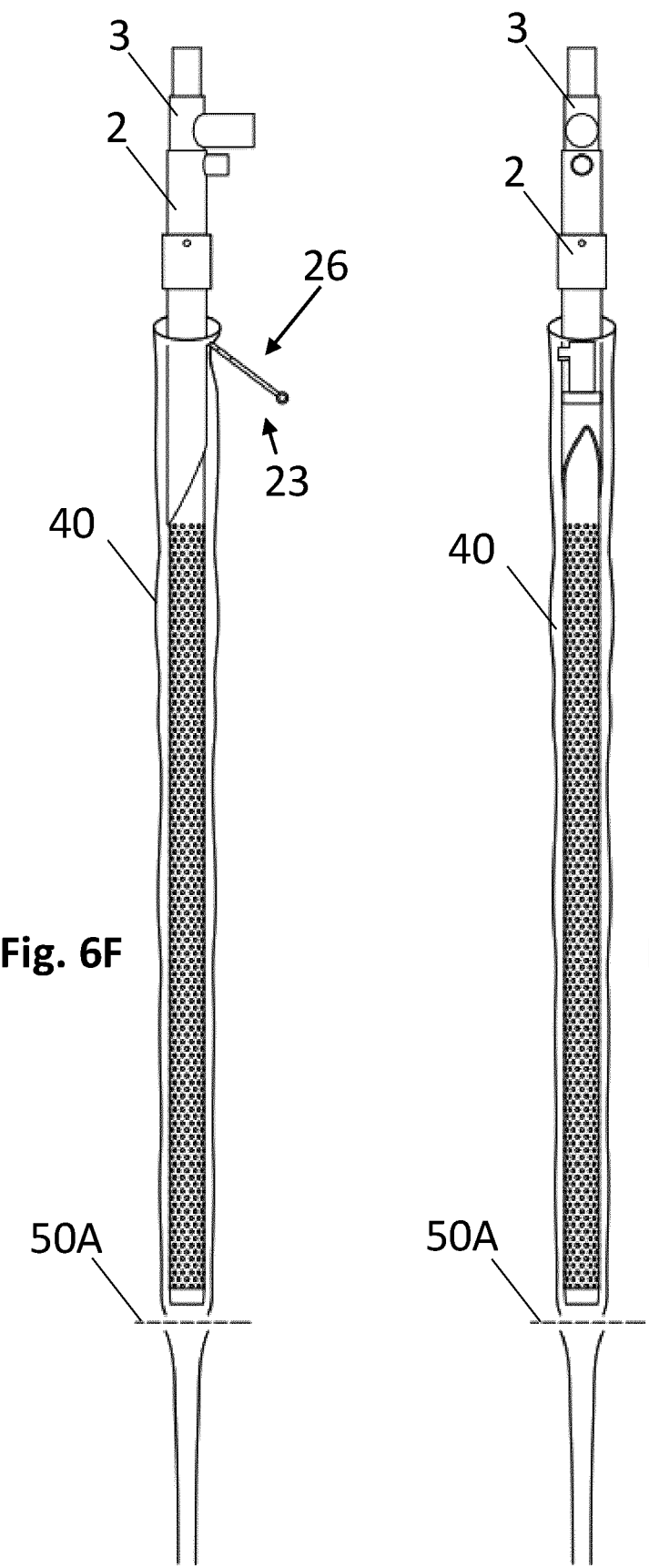

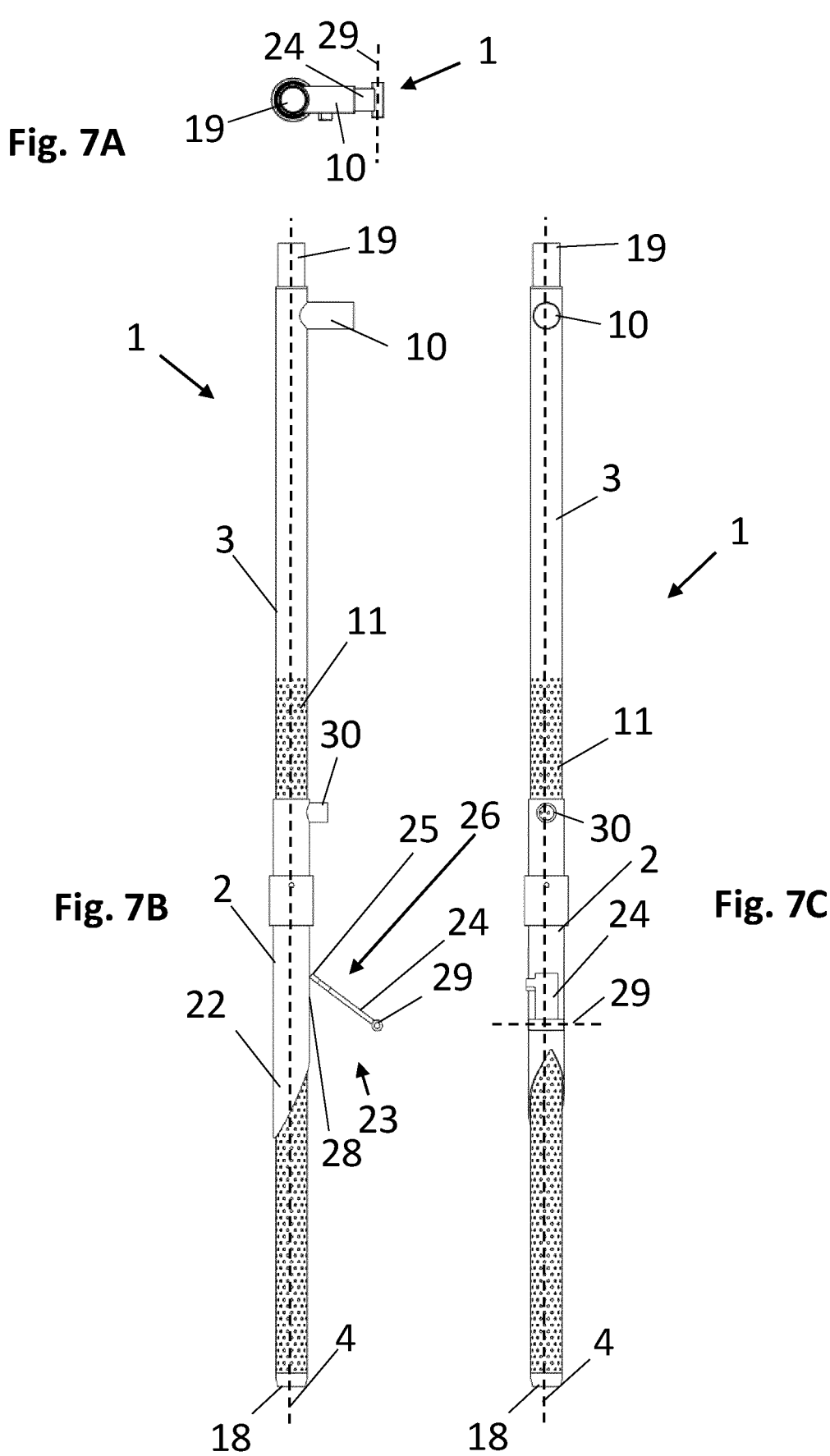

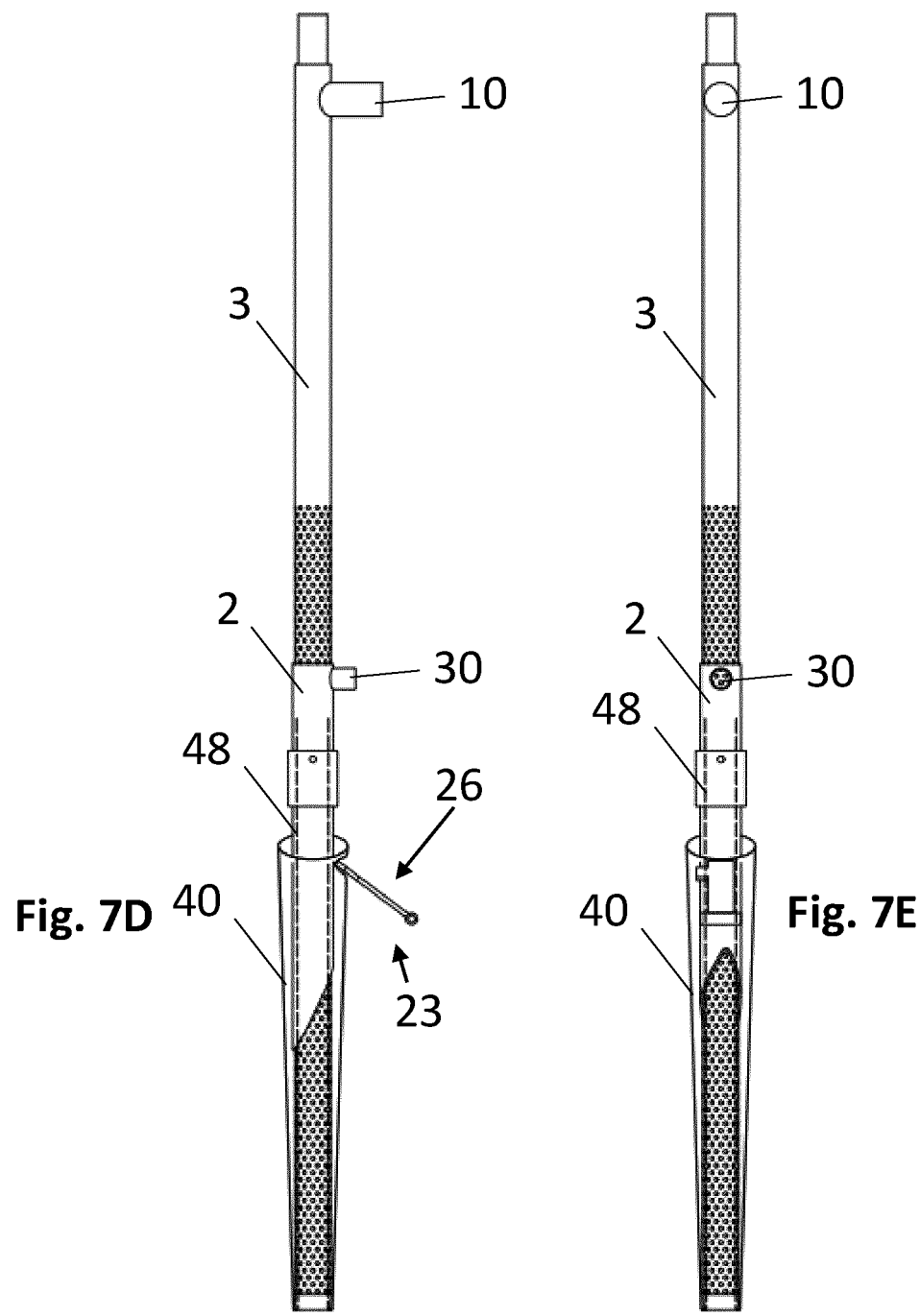

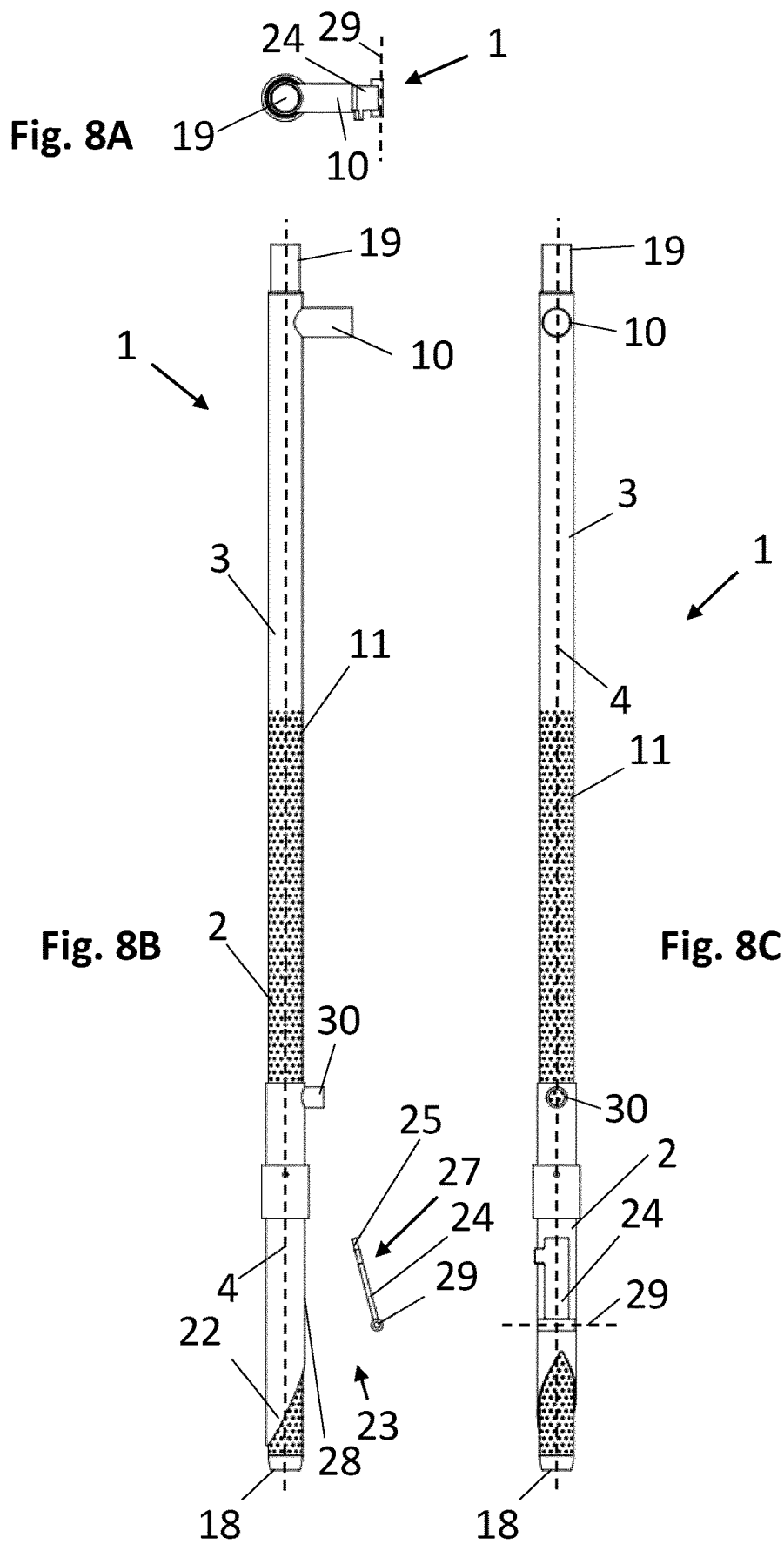

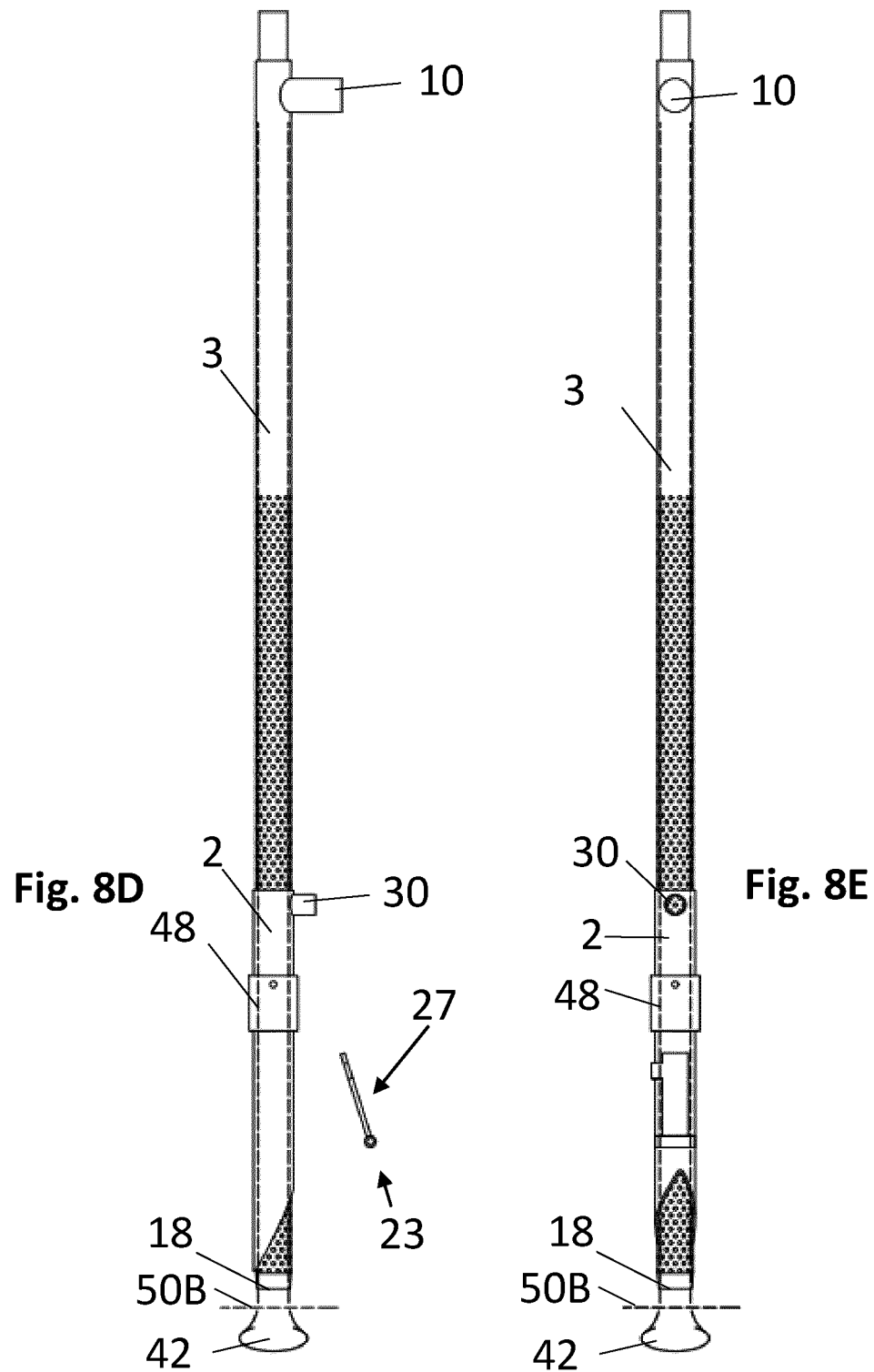

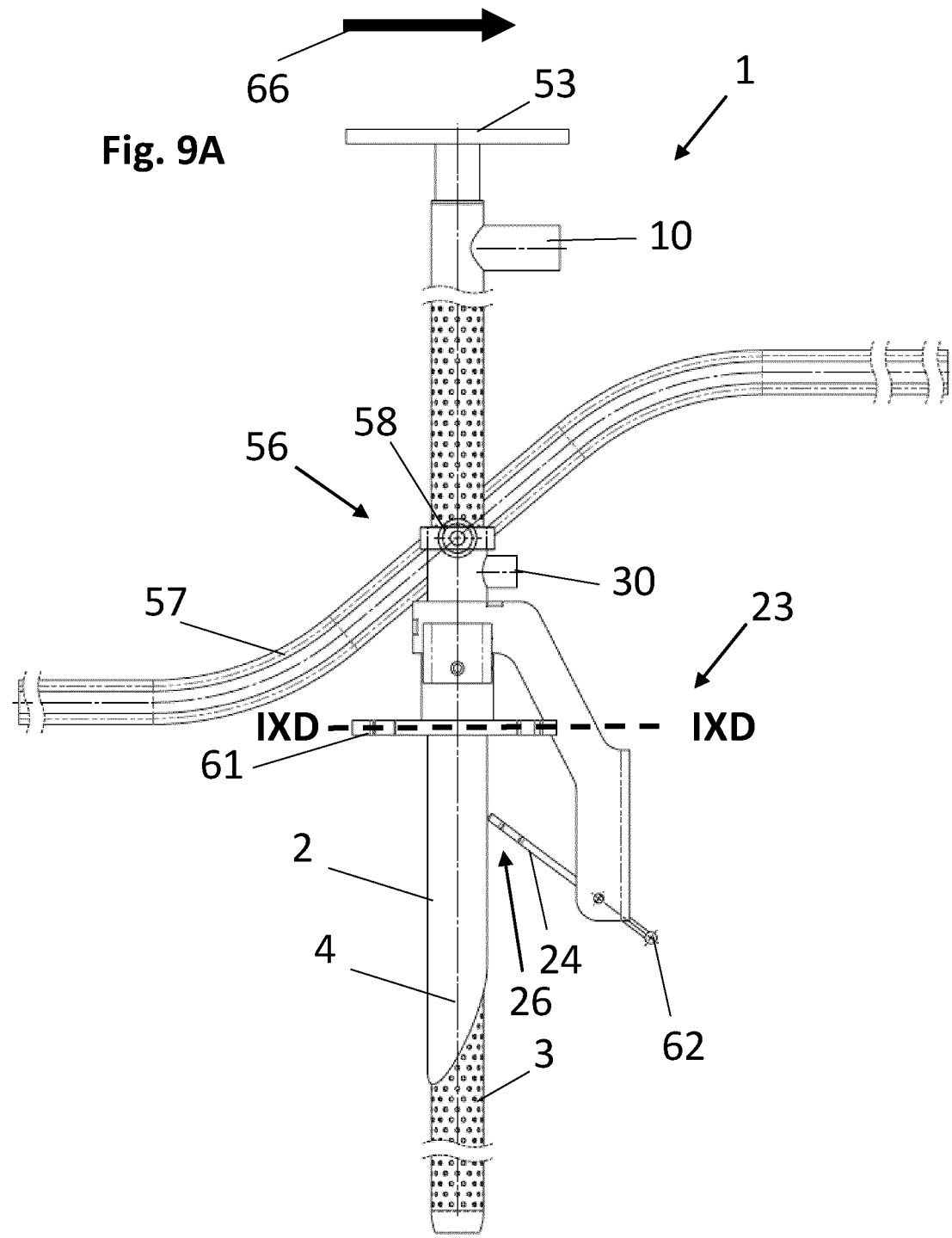

INTESTINAL TRACT PART PROCESSING DEVICE AND METHOD

CROSS-REFERENCE TO RELATED APPLICATIONS

This application is the National Stage of International Application No. PCT/EP2022/064849, filed Jun. 1, 2022, which claims the benefit of Netherlands Application No. 2028349, filed Jun. 1, 2021, the contents of which is incorporated by reference herein.

FIELD OF THE INVENTION

The present invention relates to a device for processing intestinal tract parts from slaughtered animals and a method of processing intestinal tract parts from slaughtered animals.

BACKGROUND OF THE INVENTION

Sausage products are produced by stuffing ground meat into an edible casing. Such edible casings can be of natural origin or artificial. Artificial casings can for example be made of cellulose, collagen or synthetic materials. A natural casing is obtained from the intestinal tract of an animal. The intestinal tract comprises different elongate tubular parts, such as the small intestine, the large intestine, the fat end (rectum) or cap/bung (appendix). Intestinal tract parts may originate from sheep, goats, pigs, cattle, horses, or other animals.

Artificial casings have the advantage that they are hygienic and that their sizes are uniform, which makes them easy to use in standardized industrial processes. However, consumers oftentimes prefer sustainable products, i.e. products wherein energy and natural resources are conserved. Use of the intestines from a slaughtering process as casings conserves natural resources. Furthermore, natural casings have several other advantages: they are strong enough to resist the pressure produced by filling them with meat paste, are permeable to water vapor and gases, absorb smoke for additional flavor and preservation, and expand or shrink firmly attached to the meat paste.

In order to prepare intestinal tract parts obtained from slaughtered animals for further processing into sausages or for direct consumption, they need to be cleaned. Most importantly, faecal and other undesired matter present inside the intestinal tract parts needs to be removed from the intestinal tract parts. Additionally, fat, muscle tissue and other appendages may be removed from the intestinal tract parts.

As an example of an intestinal tract part, a fat end comprises the last section of the intestinal tract of an animal. A fat end can be used as a casing for large sausage products, but can also be used for cooking.

In the art, fat ends are often cleaned by human operators by hand. A flushing liquid supply line is placed in the fat end via the sphincter opening located at the crown of the fat end, and the fat end is flushed with the flushing liquid. Additionally, at the same time the fat end can be squeezed by the human processor from the crown to the other end while removing faecal matter from the fat end. Usually, the flushing liquid is water.

However, this method is labor intensive and time consuming. The process is therefore often facilitated by suspending the fat ends from a carrier, in particular a carrier of an overhead conveyor. For example, fat ends are suspended at the crown end under the force of gravity. The conveyor moves slowly at a steady speed while personnel flushes each fat end that passes by them. This somewhat speeds up this manual process. However, it also requires personnel to remain focused at all times. If a fat end passes the cleaning personnel without being cleaned, this can cause contamination and/or cross-contamination downstream at further processing steps of the fat ends. Furthermore, even if all fat ends are cleaned, the cleaning standards of different personnel members may be different, resulting in non-uniform cleaning of different fat ends. It is possible that some personnel may use a smaller amount of flushing liquid than what is needed to provide adequate cleaning, so that the fat end is rejected later in the process, or needs to be reintroduced in the flushing process, or may even go unnoticed in the further process to contaminate other fat ends. It also possible that some personnel may use a larger amount of flushing liquid than what is needed to provide a good cleaning, which results in needless consumption of flushing liquid.

Intestinal tract parts other than fat ends may be processed in a similar way as fat ends, based on the fact that the different intestinal tract parts all have an elongate tubular shape.

SUMMARY OF INVENTION

The present invention aims to overcome at least one of the abovementioned drawbacks. Therefore, it is an objective of the invention to provide a less labour intensive method for cleaning intestinal tract parts, i.e. to remove faecal matter and/or other matter from intestinal tract parts. It is another objective of the present invention to provide a quicker way to clean intestinal tract parts. It is another objective of the present invention to provide a reliable method of cleaning intestinal tract parts. It is another objective to provide a process for cleaning intestinal tract parts in which all intestinal tract parts are cleaned equally well and in a more homogeneous way. It is another objective of the present invention to prevent waste of flushing liquid. It is another objective of the invention to provide a device enabling achievement of at least one of the above objectives.

To reach at least one of the above mentioned objectives, in a first aspect the present invention provides a device for processing intestinal tract parts, the device comprising:
- a carrier for holding the intestinal tract part on the carrier at a first end of the intestinal tract part, and
- an elongate support member having a longitudinal axis, which support member is configured for supporting the intestinal tract part on an inside of the intestinal tract part, wherein the support member comprises:
- an outer wall and an inner wall, the outer wall surrounding the inner wall,
- at least one fluid chamber arranged between the inner wall and the outer wall,
- a primary fluid connection configured for supplying a fluid to the at least one fluid chamber and/or for discharging a fluid from the at least one fluid chamber, and wherein:
- a plurality of passages are provided in the outer wall which passages provide a fluid path from the at least one fluid chamber through the outer wall,
- the carrier and the support member are movable relative to each other in a direction parallel to the longitudinal axis, and
- the carrier comprises a tubular carrying member which is arranged coaxially to the support member on an outer side of the support member.

The intestinal tract part processing device allows efficient processing of the intestinal tract part by moving the carrier and the support member with respect to each other, such that the support member is moved into and in the intestinal tract part to support the intestinal tract part on the inside thereof. Here, the carrier may be movable relative to a stationary support member, or the support member may be movable relative to a stationary carrier, or both the carrier and the support member may be movable, to reach the effect of the carrier and the support member moving with respect to each other.

An inside or inner space or inner volume of the intestinal tract part is in fluid communication with the primary fluid connection through the outer wall passages if the support member is at least partially inserted into the intestinal tract part. This fluid communication can be used to flush the inside of the intestinal tract part by supplying the fluid through the plurality of passages to the inside or inner space or inner volume of the intestinal tract part, or to evacuate fluid from the inside or inner space or inner volume of the intestinal tract part. In the latter case, the intestinal tract part may be drawn against the outer wall of the support member.

In an embodiment of the intestinal tract part processing device:
the at least one fluid chamber is in fluid communication with the primary fluid connection,
the intestinal tract part processing device comprises primary fluid control means configured to control fluid communication between the primary fluid connection and:
a flushing fluid source for providing a flushing fluid to the at least one fluid chamber, which flushing fluid is expelled from the passages if the primary fluid control means allow fluid communication between the primary fluid connection and the flushing fluid source, and/or
a primary vacuum source for depressurizing the at least one fluid chamber to a pressure below ambient pressure if the primary fluid control means allow fluid communication between the primary fluid connection and the primary vacuum source.

In such an embodiment, the primary fluid control means, on the one hand, allows expelling flushing fluid from the passages to flush the intestinal tract part and clean an inner surface and inner space or inner volume of the intestinal tract part from faecal or other matter. On the other hand, the primary fluid control means allows depressurizing an inner volume of the intestinal tract part, thereby sucking the inner surface of the intestinal tract part against the outer wall of the support member. This fixes the intestinal tract part on the support member. The primary fluid control means may be adapted to provide either one of these two different functions at a predetermined timing, and/or depending on relative positions of any two or more of the carrier, the support member, and the intestinal tract part.

In an embodiment of the intestinal tract part processing device, the flushing fluid comprises a liquid, in particular a liquid essentially consisting of, or comprising water.

A cleaning agent and/or disinfecting agent and/or any other agent with a desired effect may be added to the flushing fluid. The flushing fluid is configured to remove faecal and other undesired matter from the intestinal tract part in an efficient manner. The flushing fluid may have a temperature to optimally flush the intestinal tract part without degradation thereof.

In an embodiment of the intestinal tract part processing device, the inner wall and the outer wall are coaxially arranged cylindrical walls, wherein the at least one fluid chamber is formed as an annular cylindrical chamber.

This embodiment can be manufactured relatively easily, and minimizes any risks of damaging the intestinal tract part by mechanical pressure on the intestinal tract part tissue when the support member is inserted into the intestinal tract part, since the mechanical pressure will be exerted evenly on the intestinal tract part tissue.

In an embodiment of the intestinal tract part processing device:
the support member comprises an inner space which is at least partially surrounded by the inner wall,
the support member comprises an inner space entrance arranged on an axial end of the support member, and
the support member comprises a secondary fluid connection configured for discharging a fluid from the inner space.

Such an embodiment allows to suck at least a part of a intestinal tract part, which is at least partly supported at its inner surface on the outer wall of the support member, through the inner space entrance and further draw the intestinal tract part into the inner space of the support member, thereby inverting the intestinal tract part, i.e. turning the intestinal tract part inside out. The inverted intestinal tract part may be removed through the secondary fluid connection or another connection of the support member. This allows for an efficient processing of the intestinal tract part.

In such an embodiment of the intestinal tract part processing device:
the inner space is in fluid communication with the secondary fluid connection,
the intestinal tract part processing device comprises secondary fluid control means configured to control fluid communication between the secondary fluid connection and a secondary vacuum source, and
the secondary vacuum source is configured for depressurizing the inner space to a pressure below ambient pressure if the secondary fluid control means allow fluid communication between the secondary fluid connection and the secondary vacuum source.

In such an embodiment, the secondary fluid control means allows inversion of an intestinal tract part into which the support member is inserted into the inner space by a controlled depressurization of the inner space, thus sucking the intestinal tract part into the inner space and simultaneously inverting it. The secondary fluid control means may be adapted to provide this function at a predetermined timing, and/or depending on relative positions of any two or more of the carrier, the support member, and the intestinal tract part.

In an embodiment of the intestinal tract part processing device, the carrier and the support member are rotatable relative to each other around the longitudinal axis of the support member. This allows for rotating the carrier to a first angular position particularly suitable for arranging the intestinal tract part on the carrier and to a second angular position particularly suitable for processing the intestinal tract part. The first and second angular positions are different from each other, and are predefined. A range of rotation of the carrier may be from the first angular position to the second angular position, and vice versa, that is, between the first angular position and the second angular position.

The first angular position allows a person or device to efficiently arrange the intestinal tract part on the carrier, by gripping the intestinal tract part near organs and/or tissue located near said first end of the intestinal tract part, and moving said first end of the intestinal tract part on the carrier.

In case of a person performing the arranging operation, the first angular position carrier allows for an ergonomically optimal arranging operation. Then, the second angular position allows for orienting the carrier with the intestinal tract part arranged thereon such that processing operations on the intestinal tract part can be performed by a corresponding processing device in an optimum way. This particularly is the case when the intestinal tract part processing device forms part of an automated processing line wherein different processing operations are performed in an automated way in processing devices in different processing stations located along the processing line, and wherein the intestinal tract part is moved in the processing line along the different processing stations to be subject to the different operations by the different processing devices. The processing line may be embodied as a carrousel device, in which the processing line follows a circular path along which the intestinal tract parts are moved by the carrousel device, and wherein the processing stations are located along the circumference of the carrousel device.

In an embodiment of the intestinal tract part processing device, the support member has a substantially tubular shape. The circumferential contour and/or the cross-sectional shape of the support member, as seen in a plane at right angles to the longitudinal axis of the support member, may for example be circular, oval, or polygonal.

In an embodiment of the intestinal tract part processing device, the longitudinal axis of the support member is oriented substantially vertically. Accordingly, the substantially vertical orientation of the support member facilitates inserting the support member into the intestinal tract part, and moving it in the intestinal tract part.

In an embodiment of the intestinal tract part processing device, the tubular carrying member comprises a bevel shaped insertion end configured for inserting into said first end of the intestinal tract part.

Such an embodiment allows for an easy and efficient insertion of the carrying member into said first end of the intestinal tract part while minimizing risk of damage to the intestinal tract part upon insertion. The bevel shape may have an included angle of about 5 to 20 degrees.

In an embodiment of the intestinal tract part processing device:
the carrier comprises a locking device,
the locking device comprises a locking arm,
the locking arm has a locking end,
the locking arm is movable from a locking position to a releasing position and vice versa, and
in the locking position, the locking end is positioned closer to an outer surface of the carrying member than in the releasing position.

The locking device of such an embodiment allows for locking of the intestinal tract part on the carrier, preventing the intestinal tract part from falling, sliding or otherwise detaching from the carrier. For this purpose, in the locking position, the locking end of the locking arm locks the intestinal tract part on the carrier by clamping a part of the intestinal tract part between the locking end of the locking arm and the outer surface of the carrying member, such that said part of the intestinal tract part essentially cannot move with respect to the carrying member. The locking end of the locking arm and/or the outer surface of the carrying member, in particular the part of the outer surface opposite to the locking end of the locking arm, may be structured or may be provided with a material to enhance a grip on the intestinal tract part.

In an embodiment of the intestinal tract part processing device, the locking device is configured to bias the locking arm with its locking end towards the outer surface of the carrying member by gravity, a spring force, or a magnetic force.

In the locking position of the locking arm, the biasing provides the clamping of a part of the intestinal tract part between the locking end of the locking arm and the outer surface of the carrying member. The force exerted between the locking end of the locking arm and the outer surface of the carrying member may be predetermined, or may be allowed to be set, or may be otherwise controllable.

In case of using a magnetic force, a combination of a permanent magnet interacting with a magnetisable material may be used, or a combination of permanent magnets interacting with each other may be used, or a combination of an electromagnet (possibly controllable in time and/or generated force) interacting with magnetisable material may be used, or a combination of electromagnets interacting with each other may be used. The interaction may be either attracting or repelling, depending on the location of one of the elements of the combination, and the other element of the combination. For example, one of the elements of the combination may be located on the locking end of the locking arm, and the other one of the elements of the combination may be located on the outer surface of the carrying member, and the interaction between the elements is an attracting magnetic force.

In an embodiment of the intestinal tract part processing device, the carrier comprises a tertiary fluid connection configured for supplying a rinsing fluid to the carrier and the carrier is configured for expelling the rinsing fluid onto the intestinal tract part to rinse the intestinal tract part.

In such an embodiment, in particular said first end of the intestinal tract part, and/or the outside and/or the inside of the intestinal tract part are rinsed upon supply of the rinsing fluid. The rinsing removes unwanted matter, in particular faecal matter, from the intestinal tract part or a part thereof. The rinsing fluid comprises a liquid, in particular a liquid essentially consisting of, or comprising water. A cleaning agent and/or disinfecting agent and/or any other agent with a desired effect may be added to the rinsing fluid. The rinsing fluid is configured to remove unwanted matter from the intestinal tract part in an efficient manner. The rinsing fluid may have a temperature to optimally rinse the intestinal tract part without degradation thereof. Furthermore, the rinsing fluid aids in disengaging the inner surface of the intestinal tract part from the outer surface of the support member, or in keeping the inner surface of the intestinal tract part disengaged from the outer surface of the support member, by acting as a fluid layer between the inner surface of the intestinal tract part and the outer surface of the support member.

In an embodiment, the intestinal tract part processing device comprises an engaging device, wherein:
the engaging device is movable with respect to the support member in the direction parallel to the longitudinal axis,
the engaging device comprises engaging members configured for engaging an outer surface of the intestinal tract part supported on the support member and exerting a force on the outer surface of the intestinal tract part in the direction parallel to the longitudinal axis.

The engaging device of such an embodiment allows moving the intestinal tract part along the support member by engaging the intestinal tract part on the outer surface of the intestinal tract part and taking an engaged part of the intestinal tract part along to slide it along the outer surface of the support member supporting said engaged part. This aids in inserting the support member into the intestinal tract part, or in moving the intestinal tract part with respect to the support member, in particular to move a natural bend in the intestinal tract part past an end of the support member onto the support member, while reducing the risk of damaging the intestinal tract part in the process.

In an embodiment of the intestinal tract part processing device, the engaging members comprise two sets of engaging fingers. The fingers provide minimum, yet effective engagement of the intestinal tract part, in particular at the ends of the fingers, when the fingers are being brought into contact with parts of a region of the outer surface of the intestinal tract part, wherein the engaging members are configured to slide this region with respect to the support member supporting this region and thereby cause a part of the intestinal tract part comprising the natural bend in the intestinal tract part to slide onto the support member.

The engaging fingers may be made substantially from a rigid material. The engaging fingers may be made at least partly from a flexible resilient material. At its surface intended to engage the intestinal tract part, each engaging finger may be provided with a structured surface to enhance a grip of the finger on the outer surface of the intestinal tract part.

In an embodiment of the intestinal tract part processing device, it is configured to process a fat end, wherein the first end of the intestinal tract part is a crown end of the fat end.

In a second aspect, the invention relates to an intestinal tract part processing line comprising an intestinal tract part processing device according to any of the preceding embodiments, the processing line comprising:
  a conveyor configured for conveying said intestinal tract part processing device along a processing trajectory comprising multiple processing stations,
  a movement actuator system configured for moving the carrier and the support member relative to each other in a direction parallel to the longitudinal axis of the support member.

The conveyor may be part of a carrousel arrangement in which multiple intestinal tract part processing devices are rotatably moved along multiple processing stations, so that the processing trajectory comprises a circular trajectory or an at least partly circular trajectory.

The conveyor may alternatively comprise a conveyor runner running along a conveyor rail, such as a trolley running along a rail of an overhead conveyor, wherein the intestinal tract part processing device is supported by and/or suspended from the conveyor runner, and wherein the conveyor rail is shaped such that the conveyor runner running along the conveyor rail follows the processing trajectory. A conveyor runner may be connected to adjacent conveyor runners, each conveyor runner being associated with an intestinal tract part processing device, by chains or other suitable linking devices. Movement of the conveyor runners may be performed by a wheel engaging with said chains or linking devices.

In an embodiment of the intestinal tract part processing line, the processing line comprises a rotation actuator system configured for rotating the carrier and the support member relative to each other around the longitudinal axis of the support member. The rotation actuator system may comprise a stationary rotation member and a rotator connected to the carrier, wherein the rotator is configured to engage with the rotation member upon movement of the carrier past the rotation member, thereby rotating the carrier over a predetermined angle. The rotator may be designed similar to a Geneva drive wheel comprising lobes and slots, wherein the rotation member, such as a pin, engages a slot and lobe of the Geneva drive wheel.

In an embodiment of the intestinal tract part processing line, the processing line comprises a lock actuator system configured for moving the locking arm from the locking position to the releasing position and/or from the releasing position to the locking position.

In a third aspect, the present invention provides a method of processing an intestinal tract part. The method may be performed using the intestinal tract part processing device explained above. The method comprises the steps of:
  providing a carrier for holding the intestinal tract part,
  providing an elongate support member configured for supporting the intestinal tract part on the inside of the intestinal tract part,
wherein the support member comprises:
  an outer wall and an inner wall, the outer wall surrounding the inner wall,
  at least one fluid chamber arranged between the inner wall and the outer wall,
  a primary fluid connection configured for supplying a fluid to the at least one fluid chamber and/or for discharging a fluid from the at least one fluid chamber,
  a plurality of passages provided in the outer wall which passages provide a fluid path from the at least one fluid chamber through the outer wall,
  fixing the intestinal tract part on the carrier on a first end of the intestinal tract part,
  moving the carrier and the support member with respect to each other in a direction parallel to a longitudinal axis of the support member, thereby inserting the support member at least partially into the intestinal tract part.

The intestinal tract part processing method allows efficient processing of the intestinal tract part by moving the carrier and the support member with respect to each other, such that the support member is moved into and in the intestinal tract part to support the intestinal tract part on the inside thereof. Here, the carrier may be moved relative to a stationary support member, or the support member may be moved relative to a stationary carrier, or both the carrier and the support member may be moved, to reach the effect of the carrier and the support member moving with respect to each other.

In an embodiment, the method comprises the step of rotating the carrier with the intestinal tract part arranged thereon with respect to the support member.

Thus, the carrier may be rotated to a first angular position particularly suitable for arranging the intestinal tract part on the carrier and to a second angular position particularly suitable for processing the intestinal tract part. The first and second angular positions are different from each other, and are predefined. A range of rotation of the carrier may be from the first angular position to the second angular position, and vice versa, that is, between the first angular position and the second angular position.

The first angular position allows a person or device to efficiently arrange the intestinal tract part on the carrier, by gripping the intestinal tract part near organs and/or tissue located near a first end of the intestinal tract part, and moving the first end on the carrier. In case of a person performing the arranging operation, the first angular position carrier allows for an ergonomically optimal arranging operation. Then, the second angular position allows for orienting the carrier with the intestinal tract part arranged thereon such that processing operations on the intestinal tract part can be performed in an optimal way.

Hence, the step of rotating the carrier, in particular from the first angular position to the second angular position of the carrier, is performed before inserting the support member into the intestinal tract part.

In an embodiment, the method comprises the step of, after fixing the intestinal tract part on the carrier, removing a connected organ from the intestinal tract part by pulling and/or cutting said organ away from the intestinal tract part. The organ is located on the outside of the intestinal tract part.

In particular, the removal of an organ from the intestinal tract part is performed after inserting the support member at least partially into the intestinal tract part, whereby the intestinal tract part is held onto the support member.

In an embodiment of the method, the step of removing a connected organ from the intestinal tract part comprises the step of pulling said organ away from the intestinal tract part and subsequently severing tissue connecting the organ to the intestinal tract part. Here, the intestinal tract part, at least the part thereof connected to said tissue, is held on the support member.

In an embodiment, the method comprises the step of, after inserting the support member at least partially into the intestinal tract part such that the support member supports an engaged portion of the intestinal tract part, engaging an outer surface of the engaged portion of the intestinal tract part using an engaging member and subsequently moving the engaged portion with respect to the support member in the direction parallel to the longitudinal axis of the support member by moving the engaging member engaging the engaged portion with respect to the support member, thereby sliding the engaged portion of the intestinal tract part over the support member, such that the support member is inserted further into the intestinal tract part.

The engaging allows moving the intestinal tract part along the support member by engaging the intestinal tract part on the outer surface of the intestinal tract part and taking an engaged part of the intestinal tract part along to slide it along the outer surface of the support member supporting said engaged part. This aids in inserting the support member into the intestinal tract part, or in moving the intestinal tract part with respect to the support member, in particular to move a natural bend in the intestinal tract part past an end of the support member to slide onto the support member, while reducing the risk of damaging the intestinal tract part in the process.

In an embodiment, the method comprises the step of, after fixing the intestinal tract part on the carrier, expelling rinsing fluid into the intestinal tract part from the carrier to rinse the intestinal tract part.

In such an embodiment, in particular the first end of the intestinal tract part and/or the inside of the intestinal tract part are rinsed upon supply of the rinsing fluid. The rinsing removes unwanted matter, in particular faecal matter, from the intestinal tract part or a part thereof. The rinsing fluid comprises a liquid, in particular a liquid essentially consisting of, or comprising water. A cleaning agent and/or disinfecting agent and/or any other agent with a desired effect may be added to the rinsing fluid. The rinsing fluid is configured to remove unwanted matter from the intestinal tract part in an efficient manner. The rinsing fluid may have a temperature to optimally rinse the intestinal tract part without degradation thereof. Furthermore, the rinsing fluid may aid in disengaging the inner surface of the intestinal tract part from the outer surface of the support member, or in keeping the inner surface of the intestinal tract part disengaged from the outer surface of the support member, by acting as a fluid layer between the inner surface of the intestinal tract part and the outer surface of the support member.

In an embodiment, the method comprises the step of, after inserting the support member into the intestinal tract part, expelling flushing fluid from the plurality of passages in the outer wall of the support member facing an inner surface of the intestinal tract part to flush an inside of the intestinal tract part.

The flushing fluid may comprise a liquid, in particular a liquid essentially consisting of, or comprising water. A cleaning agent and/or disinfecting agent and/or any other agent with a desired effect may be added to the flushing fluid. The flushing fluid is configured to remove faecal and other undesired matter from the intestinal tract part in an efficient manner. The flushing fluid may have a temperature to optimally flush the intestinal tract part without degradation thereof.

In an embodiment, the method comprises the step of, after insertion of the support member into the intestinal tract part, fixing the intestinal tract part against the support member by depressurizing the passages in the outer wall of the support member facing an inner surface of the intestinal tract part to a pressure below ambient pressure. This fixing may be used to perform processing operations at the outer surface of the intestinal tract part.

In an embodiment, the method comprises the step of, after fixing the intestinal tract part against the support member, removing tissue connected to an outer surface of the intestinal tract part from the intestinal tract part by pulling and/or cutting said tissue away from the intestinal tract part. The pulling away of said tissue from the intestinal tract part may cause the tissue to break away from the outer surface of the intestinal tract part.

In the latter embodiment, the step of removing tissue connected to the outer surface of the intestinal tract part may be performed by tensioning said tissue by applying a suction force to said tissue using a suction device and subsequently cutting the tensioned tissue free from the intestinal tract part.

In an embodiment, the method comprises the step of, after fixing the intestinal tract part against the support member, detaching the intestinal tract part from the support member by pressurizing the fluid chamber which is in fluid communication with the passages in the outer wall of the support member facing the inner surface of the intestinal tract part to a pressure above ambient pressure. Accordingly, the inner surface of the intestinal tract part detaches from the outer surface of the support member.

In an alternative or additional embodiment, the method comprises the step of, after fixing the intestinal tract part against the support member, detaching the intestinal tract part from the support member by expelling rinsing fluid into the intestinal tract part from the carrier. The rinsing fluid aids in disengaging the inner surface of the intestinal tract part from the outer surface of the support member by acting as a fluid layer between the inner surface of the intestinal tract part and the outer surface of the support member.

In an embodiment, the method comprises the step of cutting a section from the intestinal tract part, in particular to cut the intestinal tract part to a predetermined length, and to discard the cut section.

In an embodiment, the method comprises the step of, after insertion of the support member into the intestinal tract part, inverting the intestinal tract part by sucking the intestinal tract part into an inner space of the support member through an inner space entrance by creating a pressure below ambient pressure in the inner space. In particular the part of the intestinal tract part facing away from the first end thereof is sucked into the inner space, whereby the intestinal tract part moved longitudinally along the support member.

In an embodiment of the method, the step of inverting the intestinal tract part comprises:
  preventing the first end of the intestinal tract part from being sucked into the inner space by providing the inner space entrance with an opening allowing an intestinal tract part body to enter the inner space while preventing the first end of the intestinal tract part from entering the inner space,
  subsequently removing the first end of the intestinal tract part from the intestinal tract part.

The first end can be prevented from entering the inner space by appropriate selection of a cross-section of the opening of the inner space entrance.

In the latter embodiment, the step of inverting the intestinal tract part is performed after the step of cutting a section to be discarded from the intestinal tract part.

In an embodiment, the method comprises the step of, after inversion of the intestinal tract part, discharging the inverted intestinal tract part through a transport channel which is in fluid communication with the inner space, for further processing of the intestinal tract part.

In an embodiment, the method comprises the step of moving the carrier and the support member along a processing trajectory comprising multiple processing stations.

In an embodiment of the method, the intestinal tract part is a fat end.

In an embodiment of the method, the first end of the intestinal tract part is a crown end of the fat end.

Some, or all of the steps of any of the above embodiments of the method can be combined.

In a fourth aspect, the invention provides a support member comprising:
  an outer wall and an inner wall surrounding a longitudinal axis, the outer wall surrounding the inner wall,
  an inner space surrounded by the inner wall,
  an inner space entrance arranged at an axial end of the elongate support member,
  at least one fluid chamber arranged between the inner wall and the outer wall,
  a primary fluid connection configured for supplying a fluid to the at least one fluid chamber and/or for discharging a fluid from the at least one fluid chamber, and
  a plurality of passages provided in the outer wall, which passages provide a fluid path from the at least one fluid chamber through the outer wall.

These and other aspects of the invention will be more readily appreciated as the same becomes better understood by reference to the following detailed description and considered in connection with the accompanying drawings in which like reference symbols designate like parts.

BRIEF DESCRIPTION OF THE FIGURES

Embodiments of the invention will be described by way of example only, with reference to the accompanying schematic drawings in which corresponding reference symbols indicate corresponding parts.

FIG. 1A depicts a top view of an assembly of a support member, a carrier and a locking device of an embodiment of an intestinal tract part processing device according to the invention with the carrier in a first relative position to the support member.

FIG. 1B depicts a front view of the assembly of FIG. 1A with the carrier in the first relative position to the support member.

FIG. 1C depicts a side view of the assembly of FIG. 1A with the carrier in the first relative position to the support member.

FIG. 1D depicts a front view of a part of the carrier of the assembly of FIG. 1A on a larger scale with the carrier in the first relative position to the support member according to FIG. 1B, wherein the carrier supports a schematically indicated fat end by the crown thereof. The fat end is drawn translucently in this figure and all following figures depicting the fat end for the sake of clarity.

FIG. 1E depicts a side view of a part of the carrier of the assembly of FIG. 1A on a larger scale with the carrier in the first relative position to the support member according to FIG. 1C, wherein the carrier supports the fat end schematically indicated in FIG. 1D by the crown thereof.

FIG. 3A depicts a top view of the assembly of FIG. 1A with the carrier in a second relative position to the support member.

FIG. 3B depicts a front view of the assembly of FIG. 3A with the carrier in the second relative position to the support member.

FIG. 3C depicts a side view of the assembly of FIG. 3A with the carrier in the second relative position to the support member.

FIG. 3D depicts a front view of the assembly of FIG. 3A with the carrier in the second relative position to the support member according to FIG. 3B, wherein the carrier supports a schematically indicated fat end by the crown thereof.

FIG. 3E depicts a side view of the assembly of FIG. 3A with the carrier in the second relative position to the support member according to FIG. 3C, wherein the carrier supports the fat end schematically indicated in FIG. 3D by the crown thereof.

FIG. 4A depicts a top view of the assembly of FIG. 1A with the carrier in a third relative position to the support member.

FIG. 4B depicts a front view of the assembly of FIG. 4A with the carrier in the third relative position to the support member.

FIG. 4C depicts a side view of the assembly of FIG. 4A with the carrier in the third relative position to the support member.

FIG. 4D depicts a front view of the assembly of FIG. 4A with the carrier in the third relative position to the support member according to FIG. 4B, wherein the carrier supports a schematically indicated fat end by the crown thereof.

FIG. 4E depicts a side view of the assembly of FIG. 4A with the carrier in the third relative position to the support member according to FIG. 4C, wherein the carrier supports the fat end schematically indicated in FIG. 4D by the crown thereof.

FIG. 4F depicts a side view of the assembly of FIG. 4A supporting a fat end according to FIG. 4D, wherein an organ is severed from the fat end.

FIG. 4G depicts a side view of the assembly of FIG. 4A supporting a fat end according to FIG. 4E, wherein an organ is severed from the fat end.

FIG. 5A depicts a front view of the assembly with the carrier in the third relative position to the support member.

FIG. 5B depicts a side view of the assembly of FIG. 5A with the carrier in the third relative position to the support member.

FIG. 5C depicts a front view of the assembly with the carrier in the third relative position to the support member according to FIG. 5A, wherein the carrier supports a schematically indicated fat end by the crown thereof.

FIG. 5D depicts a side view of the assembly of FIG. 5A with the carrier in the third relative position to the support member according to FIG. 5B, wherein the carrier supports the fat end schematically indicated in FIG. 5C by the crown thereof and wherein the fat end is engaged by an engaging member.

FIG. 6A depicts a top view of the assembly of FIG. 1A with the carrier in a fourth relative position to the support member.

FIG. 6B depicts a front view of the assembly of FIG. 6A with the carrier in the fourth relative position to the support member.

FIG. 6C depicts a side view of the assembly of FIG. 6A with the carrier in the fourth relative position to the support member.

FIG. 6F depicts a front view of the assembly of FIG. 6A supporting a fat end according to FIG. 6D, wherein a free hanging section is severed from the rest of the fat end.

FIG. 6G depicts a side view of the assembly of FIG. 6A supporting a fat end according to FIG. 6E, wherein a free hanging section is severed from the rest of the fat end.

FIG. 7A depicts a top view of the assembly of FIG. 1A with the carrier in a fifth relative position to the support member.

FIG. 7B depicts a front view of the assembly of FIG. 7A with the carrier in the fifth relative position to the support member.

FIG. 7C depicts a side view of the assembly of FIG. 7A with the carrier in the fifth relative position to the support member.

FIG. 7D depicts a front view of the assembly of FIG. 7A with the carrier in the fifth relative position to the support member according to FIG. 7B, wherein the carrier supports a schematically indicated fat end by the crown thereof and part of the fat end is inverted.

FIG. 7E depicts a side view of the assembly of FIG. 7A with the carrier in the fifth relative position to the support member according to FIG. 7C, wherein the carrier supports the fat end schematically indicated in FIG. 7D by the crown thereof and part of the fat end is inverted.

FIG. 8A depicts a top view of the assembly of FIG. 1A with the carrier in a sixth relative position to the support member.

FIG. 8B depicts a front view of the assembly of FIG. 8A with the carrier in the sixth relative position to the support member.

FIG. 8C depicts a side view of the assembly of FIG. 8A with the carrier in the sixth relative position to the support member.

FIG. 8D depicts a front view of the assembly of FIG. 8A with the carrier in the sixth relative position to the support member according to FIG. 8B, wherein most or all of the fat end is inverted.

FIG. 8E depicts a side view of the assembly of FIG. 8A with the carrier in the sixth relative position to the support member according to FIG. 8C, wherein most or all of the fat end is inverted.

FIG. 9A schematically depicts a side view of a section of an embodiment of a fat end processing line comprising a fat end processing device according to the invention.

DETAILED DESCRIPTION OF THE FIGURES

Figure 2A:
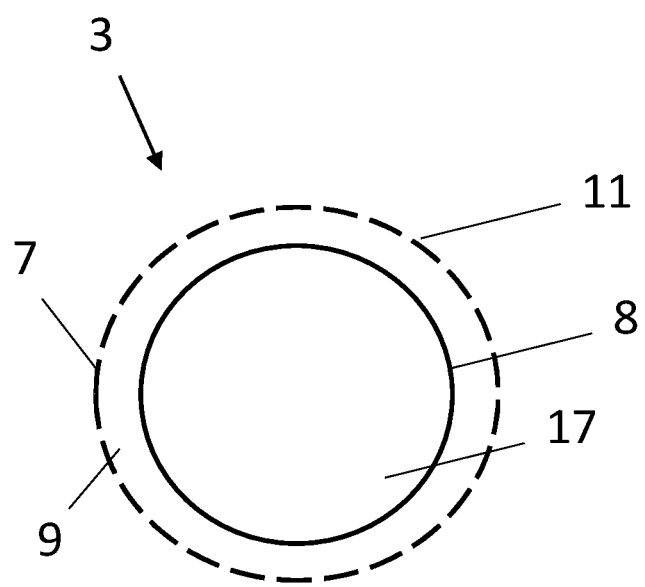
FIG. 2A shows a cross-section of an embodiment of a support member according to the invention, wherein the cross-section is indicated in FIG. 1B by dash-dotted line II-II.
Figure 2B:
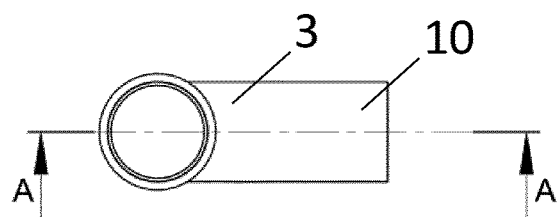
FIG. 2B shows a top view of an embodiment of a support member according to the invention.
Figure 2C:
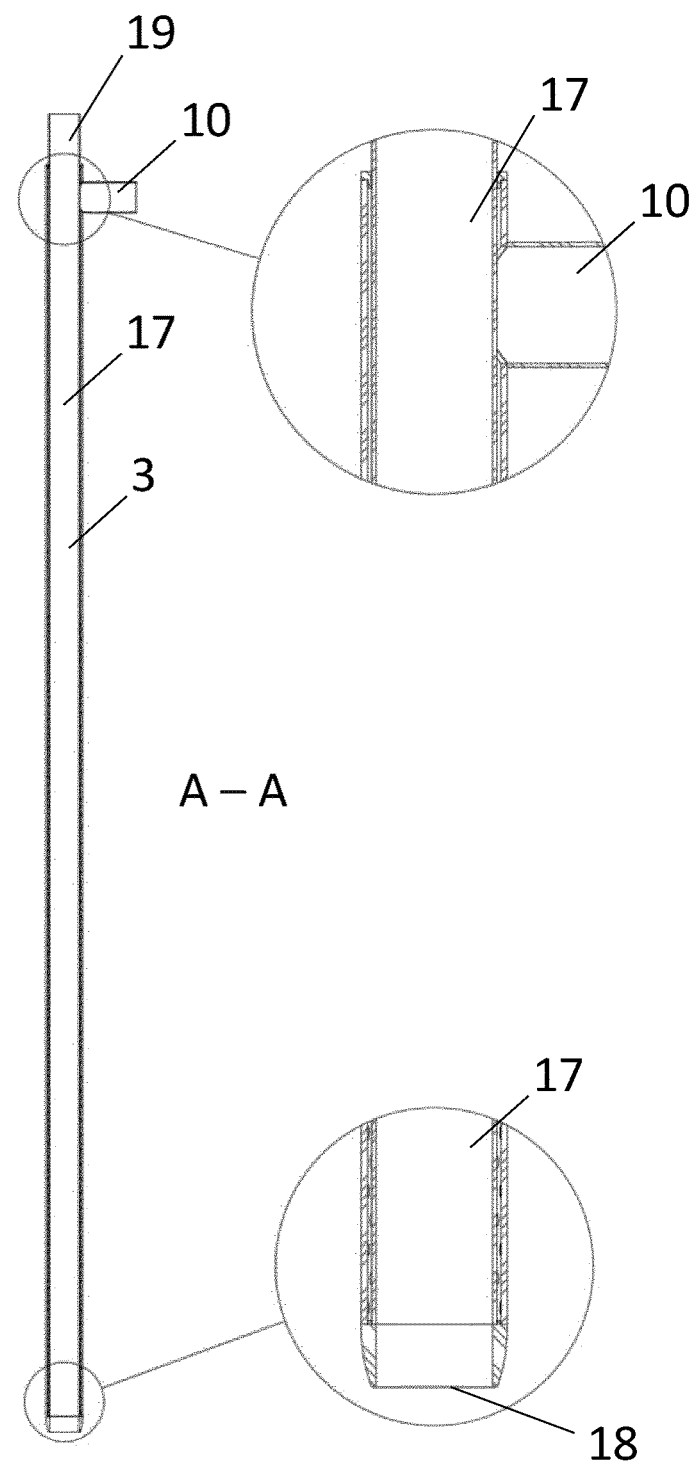
FIG. 2C shows a cross section of an embodiment of an embodiment of a support member according to the invention, wherein the cross-section is indicated in FIG. 2B by dash-dotted line A-A.
Figure 2D:
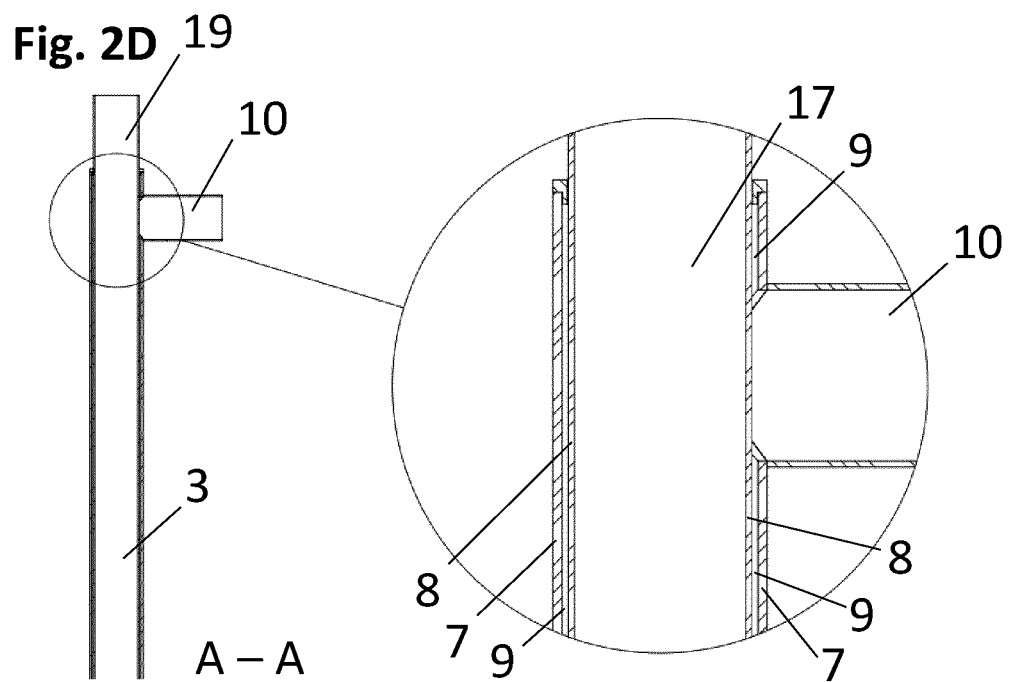
FIG. 2D shows an enlarged view of a first section of FIG. 2C.
Figure 2E:
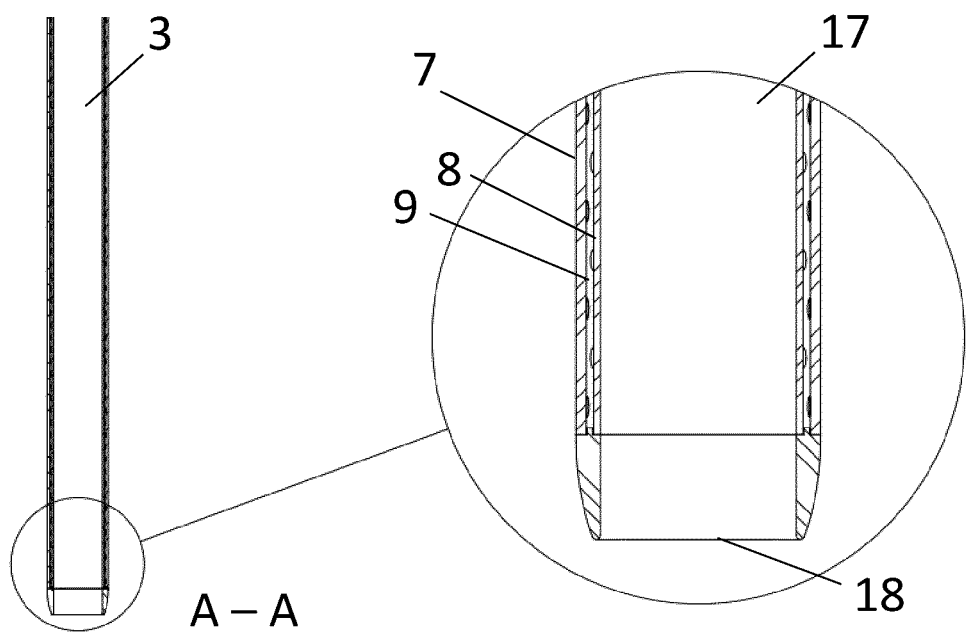
FIG. 2E shows an enlarged view of a second section of FIG. 2C.

FIGS. 1A-1E show an embodiment of an intestinal tract part processing device according to the invention, wherein the intestinal tract part processing device is exemplified as a fat end processing device 1 for processing a fat end 40.

The fat end processing device 1 comprises a carrier 2 and an elongate support member 3 having a substantially tubular shape. A longitudinal axis 4 of the support member 3 is oriented in a vertical direction.

The carrier 2 and the support member 3 are movable with respect to each other in a direction parallel to the longitudinal axis 4. In FIGS. 1A-1E, the carrier 2 and the support member 3 are arranged in a first relative position. The carrier 2 comprises a tubular carrying member 6 arranged at an outer side of the support member 3. The tubular carrying member 6 comprises a bevel shaped insertion end 22.

The carrier 2 comprises a locking device 23 to lock a crown end of the fat end onto the carrier 2. The locking device 23 comprises a locking arm 24 which is movable, in particular rotatable, from a locking position 26 to a releasing position 27, as indicated in FIG. 1E. In the releasing position 27, the tubular carrying member 6 can be inserted into or removed from a fat end 40. In the locking position 26, a fat end 40 can be held on the carrier 2. A rotational axis 29 of the locking arm 24 is positioned below the locking end 25 of the locking arm 24. In FIGS. 1A-1D, the locking device 23 is shown in the locking position 26. In the locking position 26, a locking end 25 of the locking arm 24 is positioned closer to an outer surface 28 of the carrying member 6 than in the releasing position 27. The locking device 23 is configured to bias the locking arm 24 with its locking end 25 towards the outer surface 28 of the carrying member 6 by gravity. This bias may alternatively or additionally be achieved by a spring force or a magnetic force forcing the locking arm 24 in its locking position 26.

The carrier 2 comprises a tertiary fluid connection 30 which is configurable for supplying a rinsing fluid to the carrier 2. The carrier 2 is configured for expelling the rinsing fluid onto, in particular into, the fat end to rinse the fat end 40.

As shown in FIGS. 1D and 1E, the carrier 2 is configured to hold a fat end 40 on a crown end 41 thereof. The support member 3 is configured to support the fat end 40 on the inside thereof by insertion of the support member 3 into the fat end 40.

FIG. 1B shows the carrier 2 and the support member 3 in a first relative position, suitable for inserting a tubular carrying member 6 of the carrier 2 into the fat end 40 at the crown end 41 thereof, or equivalently, sliding the fat end 40 at the crown end 41 thereof on the tubular carrying member 6. The tubular carrying member 6 is provided with the bevel shaped insertion end 22 to facilitate partial insertion of the tubular carrying member 6 into the crown of the fat end 40, or equivalently, to facilitate the crown of the fat end 40 to slide on the tubular carrying member 6. Arranging the fat end 40 on the tubular carrying member 6 may be performed by a person positioned in front of the assembly shown in FIG. 1B, and holding the fat end 40 by organs or tissue 44 connected to the fat end 40 at or near the crown end 41 thereof with their right hand. This allows for an easy, sideways and upwards movement of the right arm of the person for arranging the fat end 40 on the tubular carrying member 6. Of course, the person may also be left-handed, and an easy, opposite sideways and similar upwards movement of the left arm of the person then allows for arranging the fat end 40 on the tubular carrying member 6.

In the arranging process, the locking arm 24 rotates around the rotational axis 29 when the locking end 25 is pushed away from the outer surface of the tubular carrying member 6 by the (crown end 41 of the) fat end 40, under a biasing force driving the locking end 25 back to the outer surface of the tubular carrying member 6. After the arranging process, the locking device 23 automatically locks the fat end 40 in position, and prevents the fat end 40 from slipping, falling, or otherwise becoming disconnected from the carrier 2 in the locking position 26, as illustrated in particular in FIG. 1E, while allowing insertion of the carrier 2 into the fat end and removal of the carrier 2 from the fat end in the releasing position 27.

FIG. 1B shows a front view of the assembly of carrier 2, support member 3 and locking device 23 in the first relative position. FIG. 1C shows a side view of the assembly of carrier 2, support member 3 and locking device 23 in the first relative position. FIGS. 1D and 1E show the respective corresponding front and side view of the first relative position, where a fat end 40 is arranged on the tubular carrying member 6.

The rinsing fluid may be expelled from the carrier 2 onto an outer surface 43 of the fat end 40 and/or onto an inner surface of the fat end 40, in order to rinse one or both of these surfaces. Furthermore, expelling rinsing fluid onto an inner surface of the fat end 40 may aid in lubricating the fat end, easing insertion of the bevelled tubular carrying member 6 into the fat end 40 and reducing a risk of damaging the fat end 40 during insertion of the tubular carrying member 6 into the fat end.

It is noted, that in the first relative position of the carrier 2 and the support member 3 as shown in FIGS. 1A-1E, the support member 3 is not in contact with the fat end 40. According to said Figures, an end part of the support member 3 is located inside the carrier 2.

As shown in FIGS. 2A-2E, the support member 3 comprises an outer wall 7 and an inner wall 8. A fluid chamber 9 is arranged between the inner wall 8 and the outer wall 7. The inner wall 8 and the outer wall 7 are coaxially arranged cylindrical walls. The fluid chamber 9 is an annular coaxial chamber. The support member 3 further comprises a primary fluid connection 10 for supplying a fluid to the fluid chamber 9 and for discharging a fluid from the fluid chamber 9. Passages 11 are provided in the outer wall 7, in particular in a section of the outer wall 7, to provide a fluid path from the fluid chamber 9 through the outer wall 7.

The fluid chamber 9 is in fluid communication with the primary fluid connection 10. Primary fluid control means 13A (schematically indicated in FIG. 1B) control a supply of fluid (i.e., a gas or a liquid, or a combination thereof) to the primary fluid connection 10. This fluid may be a flushing fluid provided by a flushing fluid source 14 (schematically indicated in FIG. 1B), which is supplied to the fluid chamber 9 and expelled from the passages 11. The flushing fluid comprises a liquid, in particular a liquid essentially consisting of, or comprising water. Additionally or alternatively, primary vacuum control means 13B may bring the primary fluid connection 10 in fluid communication with a primary vacuum source 16 in order to depressurize the fluid chamber 9 to a pressure below ambient pressure. Herein, the expression vacuum source is to be taken to mean a source of pressure below ambient pressure. The primary fluid control means 13A and the primary vacuum control means 13B each may comprise a valve, in particular a controllable valve which is controllable by a person or device.

In use, flushing fluid may be expelled from the passages 11 after inserting the support member 3 at least partially into a fat end 40. Said flushing fluid is supplied to the support member 3 via the primary fluid connection 10, flowing into the fluid chamber 9 arranged between the inner wall 8 and the outer wall 7 of the support member 3. The fat end interior is thereby flushed and cleaned from substances such as partially digested food and faecal matter.

FIGS. 3A-3E show the embodiment of the fat end processing device 1 wherein the carrier 2 and the support member 3 are oriented in a second relative position, wherein the carrier 2 and the support member 2 are rotated with respect to each other around the longitudinal axis 4 from a first relative position to a second relative position when compared to the first relative position as shown in FIGS. 1A-1E.

In use, the fat end is fixed on a crown end thereof on the carrier 2 when the carrier 2 and the support member 3 are in the first relative position. The carrier 2 with the fat end arranged thereon and the support member 3 are then rotated with respect to each other over an angle of about 90 degrees (compare FIGS. 1A-1C to FIGS. 3A-3C). A worker may arrange the fat end on the carrier 2 using a single hand, preferably their dominant hand. Due to the shape of the fat end 40 and connected organs 44, a preferred orientation exists in which it is most convenient for a worker to arrange the fat end 40 on the carrier 2 using their dominant hand.

In a practical application, the device 1 may be incorporated in a processing line comprising a conveyor 53 that transports the device along a processing path comprising multiple processing stations. At a processing station, operations may be performed upon the fat end, such as arranging the fat end 40 on the carrier 2 or removing organs 44 from the fat end 40. Due to spatial considerations, it may be preferable to position operating equipment on the same side of the processing line as the workers. Rotation of the carrier 2 with the fat end 40 arranged thereon allows the organ 44 to be presented to operating equipment such as tissue severing means in an optimal orientation, allowing efficient removal of the organs 44 from the fat end 40.

Whereas the first relative position is well suited for arranging the fat end 40 on the tubular carrying member 6, the second relative position is well suited for performing processing operations on the fat end 40, at the front side of the assembly. The angular difference between the first relative position and the second relative position is shown in FIGS. 1B and 1C (as well as FIGS. 1D and 1E) to be about 90 degrees (absolute value, the actual direction depending on the right-handedness or the left-handedness of the person arranging the fat end 40 on the tubular carrying member 6), but in some embodiments may be between about 60 and about 120 degrees (absolute value).

FIGS. 4A-4G show the embodiment of the fat end processing device 1 wherein the carrier 2 and the support member 3 are in a third relative position, wherein the carrier 2 and the support member 3 are moved in the direction parallel to the longitudinal axis 4 with respect to each other when compared to the second relative position shown in FIGS. 3A-3E. In use, the support member 3 is partially inserted into the fat end by moving the carrier 2 and the support member 3 from the second relative position to the third relative position. This movement is performed after rotating the carrier 2 with respect to the support member 3, and after the fat end is fixed on the carrier 2.

An organ 44 connected to the fat end 40 is removed by pulling and/or cutting said organ 44 away from the fat end 40. The organ 44 may comprise a bladder, uterus or other organs of the animal, and/or other tissue such as fat, muscle or glandular tissue.

FIGS. 5A and 5B show the embodiment of the fat end processing device 1 wherein a curve 39 of the fat end 40 hinders further insertion of the support member 3 into the fat end 40 without damaging the fat end 40. In general, at least 80% of fat ends 40 comprise such a curve 39. An engaging device 32 engages the fat end 40 and moves with respect to the support member 3 to allow further insertion of the support member 3 into the fat end 40, as is explained below in detail.

FIGS. 5C and 5D show the embodiment of the fat end processing device 1 wherein the support member 3 is inserted into the fat end 40 past the curve 39.

Figure 5E:
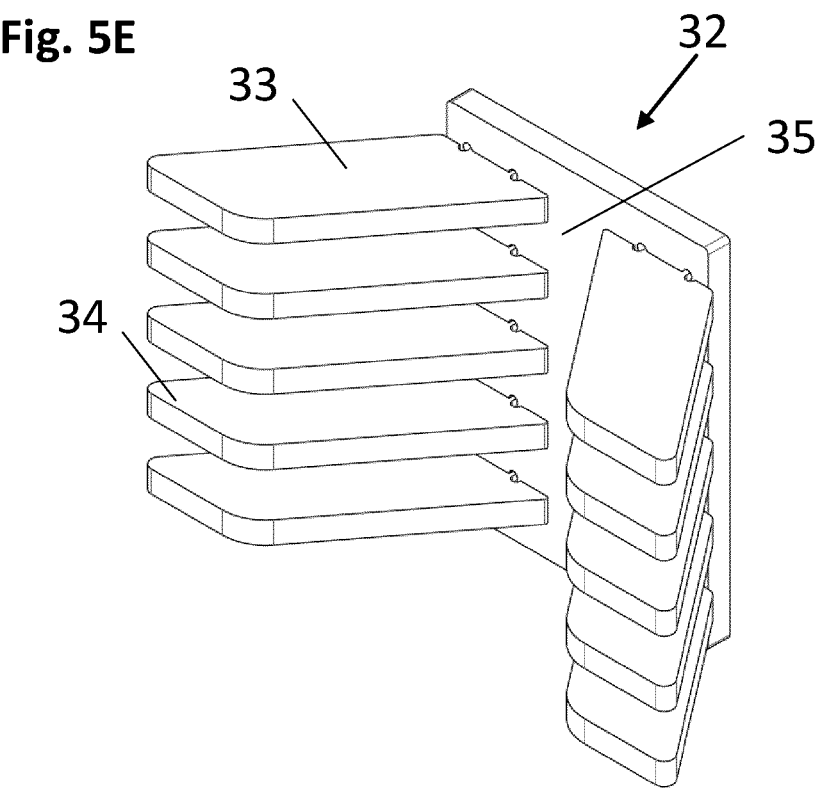
FIG. 5E depicts a perspective view of an engaging member.
Figure 5F:
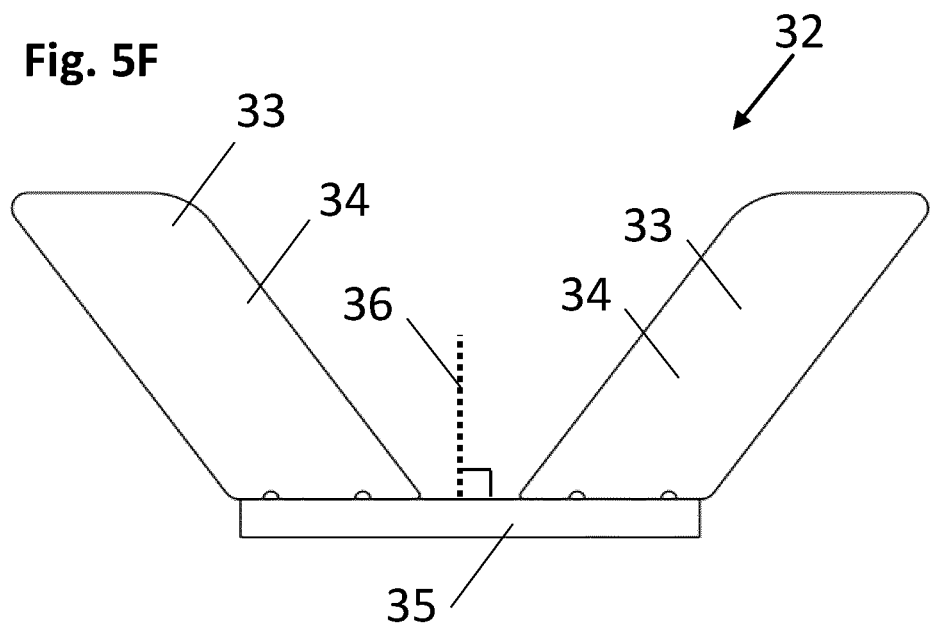
FIG. 5F depicts a top view of an engaging member.
Figure 6D:
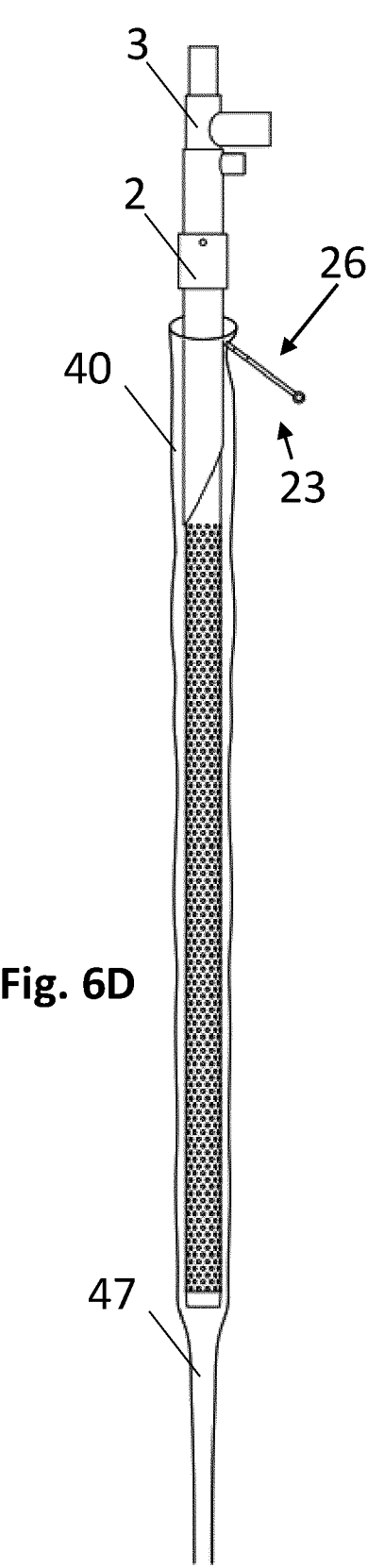
FIG. 6D depicts a front view of the assembly of FIG. 6A with the carrier in the fourth relative position to the support member according to FIG. 6B, wherein the carrier supports a schematically indicated fat end by the crown thereof.
Figure 6E:
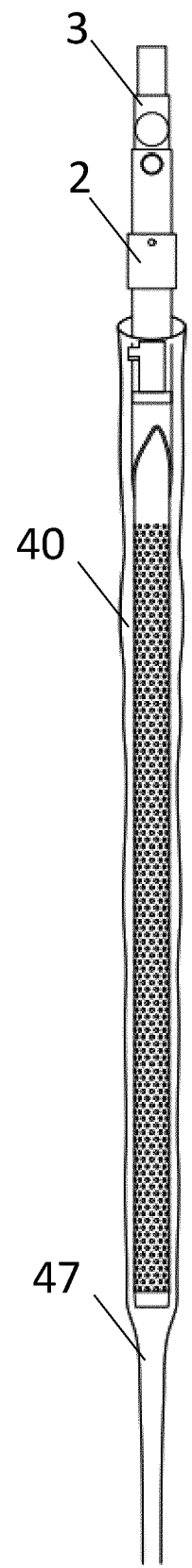
FIG. 6E depicts a side view of the assembly of FIG. 6A with the carrier in the fourth relative position to the support member according to FIG. 6C, wherein the carrier supports the fat end schematically indicated in FIG. 6D by the crown thereof.
Figure 6H:
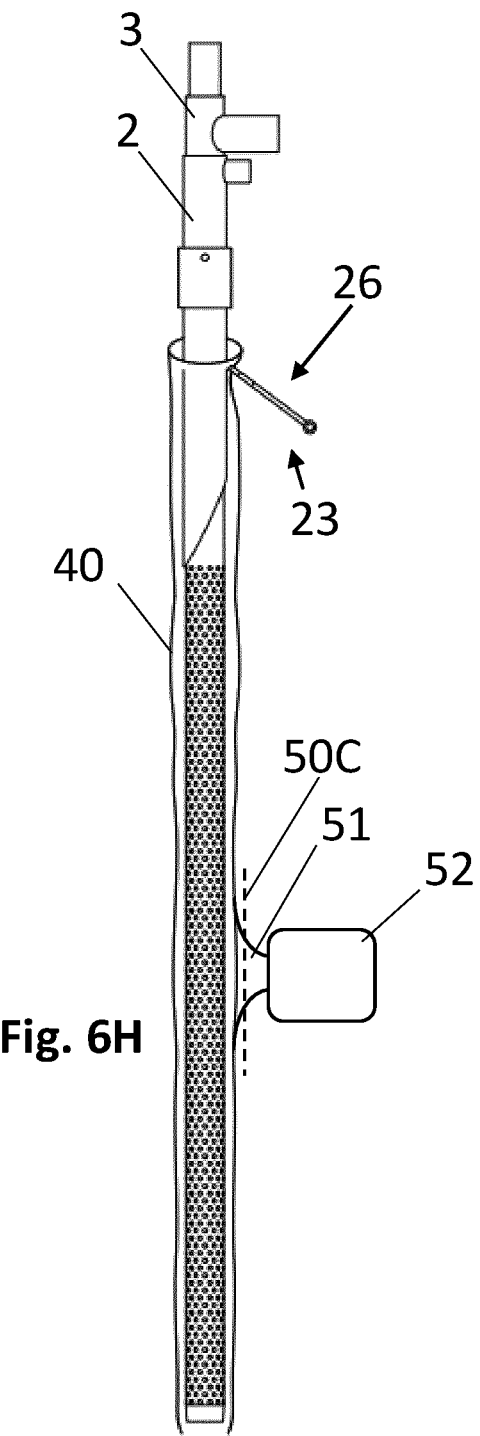
FIG. 6H depicts a front view of the assembly of FIG. 6A supporting a fat end according to FIG. 6D, wherein tissue connected to the fat end is removed from the fat end

FIGS. 5E and 5F shows a perspective view and a top view of the engaging device 32, respectively. The engaging device 32 is movable with respect to the support member 3 in the direction parallel to the longitudinal axis 4. The engaging device 32 comprises engaging members 33 for engaging an outer surface 43 of the fat end 40.

The imaged engaging members 33 comprise two sets of engaging fingers 34, although other types of engaging members 33 are also possible. The engaging fingers 34 are substantially straight and extend from an engaging base 35. The engaging fingers 34 extend divergently from the engaging base 35 and under an angle of between 0 degrees and 45 degrees with respect to a normal 36 of the engaging base 35, in particular an angle between 0 degrees and 35 degrees.

In order to assist further insertion of the support member 3 into the fat end, an outer surface 43 of the fat end 40 is in use engaged by the engaging device 32. The engaging device 32 is subsequently moved with respect to the support member 3 in the direction parallel to the longitudinal axis 4 of the support member 3 in an upwards direction. An engaged portion 49 of the fat end 40 thereby slides over the support member 3. This step may be performed after inserting the support member 3 at least partially into the fat end, such that the support member 3 is inserted further into the fat end. Applying this step allows insertion of the support member 3 into a fat end beyond a bend, curve, choke point, or other obstruction of a fat end while minimizing the risk of damage to the fat end.

FIGS. 6A-6H show the embodiment of the fat end processing device 1 wherein the carrier 2 and the support member 3 are in a fourth relative position, wherein the carrier 2 and the support member 3 are moved in the direction parallel to the longitudinal axis 4 with respect to each other when compared to the third relative position shown in FIGS. 4A-4G. In use, the support member 3 is fully inserted into the fat end 40 in the fourth position, as shown in FIGS. 6D-6G. Although part of the support member 3 is not inserted in the fat end 40, the term "fully inserted" is used to indicate that the support member 3 is not configured to be inserted further into the fat end 40 than it is in the fourth relative position.

In use, a free hanging section 47 of the fat end hangs down from the support member 3 when the carrier and the support member are in the fourth relative position. This free hanging section 47 is severed from the rest of the fat end 40 along sectioning line 50A by severing means such as a (rotating) knife or a water jet cutter, as indicated in FIGS. 6F and 6G. This allows cutting the fat end 40 to a specific length. This specific length may be influenced by choosing an appropriate length of the support member 3 or by choosing an appropriate fourth relative position.

In use, the fat end 40 may be fixed or held against the outer wall 7 of the support member 3 by depressurizing the passages 11 to a pressure below ambient pressure, in particular by depressurizing the fluid chamber 9 via the primary vacuum control means 13B and/or the primary vacuum source 16. Fatty tissue 51 comprising fat, glands, mesentery and other tissue connected to the fat end 40 is then removed from the fat end 40 by applying a suction force to the fatty tissue 51 using a suction device 52 and severing the fatty tissue 51 from the fat end 40 along a fatty tissue severing line 50C. fixing or holding the fat end 40 against the outer wall 7 limits stretching of the fat end 40 when force is exerted on the fatty tissue 51 that is to be removed from the fat end 40, such that the fat end 40 is not damaged by the severing operation. The suction device 52 may be moved along the fat end 40 in order to allow removal of fatty tissue 51 on multiple positions along the fat end 40. Suction devices 52 may be employed at multiple circumferential positions around the longitudinal axis 4.

After the above step of fixing the fat end 40 against the support member 3 by depressurizing the fluid chamber 9 and performing processing steps such as removal of an organ or tissue 44 connected to an outer surface 43 of the fat end 40, the fat end 40 may be detached from the support member 3 by pressurizing the fluid chamber 9 to a pressure above ambient pressure. Said pressurization may be performed using a fluid such as the flushing liquid (by controlling the primary fluid control means 13A to supply flushing liquid from the flushing fluid source 14) or air. As a result of said pressurization, the low pressure previously holding the fat end against the outer wall 7 of the support member 3 is neutralized, detaching the fat end 40 from the support member 3. The fluid used to pressurize the fluid chamber 9 may be expelled from the passages 11 and be positioned between the outer wall 7 of the support member 3 and the inner surface of the fat end. This detaching of the fat end from the support member 3 allows the fat end to slide with respect to the support member 3.

FIGS. 7A-7E show the embodiment of the fat end processing device 1 wherein the carrier 2 and the support member 3 are in a fifth relative position, wherein the carrier 2 and the support member 3 are moved in the direction parallel to the longitudinal axis 4 with respect to each other when compared to the fourth relative position shown in FIGS. 6A-6G, such that the carrier 2 is moved towards entrance 18 of inner space 17 during movement from the fourth relative position to the fifth relative position thereof. The locking device 23 is in the locking position 26.

The inner space 17 of the support member 3 is in fluid communication with the environment via inner space entrance 18 arranged on an axial end of the support member 3. The inner space 17 is surrounded by the inner wall 8. The support member 3 comprises a secondary fluid connection 19 for discharging a fluid from the inner space 17. The device 1 comprises secondary fluid control means 20 configured to control fluid communication between the secondary fluid connection 19 and a secondary vacuum source 21. The secondary vacuum source 21 is configured for depressurizing the inner space 17 to a pressure below ambient pressure if the secondary fluid control means 20 are configured to allow fluid communication between the secondary fluid connection 19 and the secondary vacuum source 21.

In use, the inner space 17 is pressurized to a pressure below atmospheric pressure during the movement from the fourth relative position to the fifth relative position. The fat end 40 is thereby sucked into the inner space 17 through the inner space entrance 18, inverting the fat end 40 in the process. The inverted portion 48 of the fat end 40 is drawn using dashed lines.

FIGS. 8A-8E show the embodiment of the fat end processing device 1 wherein the carrier 2 and the support member 3 are in a sixth relative position, wherein the carrier 2 and the support member 3 are moved in the direction parallel to the longitudinal axis 4 with respect to each other when compared to the fifth relative position shown in FIGS. 7A-7E, such that the carrier 2 is moved towards the entrance 18 of the inner space 17 during movement from the fifth relative position to the sixth relative position. The locking device 23 is in the releasing position 27.

As shown in FIGS. 8D and 8E, the fat end is (almost) fully inverted and inserted into the inner space 17. The crown 42 of the fat end 40 does not fit through the inner space entrance 18, such that the fat end is held in place against a vacuum force caused by a pressure difference between the environment and the inner space 17, wherein the inner space 17 is at a lower pressure than the environment. The crown 42 is substantially removed from the fat end at crown removal position 50B, as indicated in FIGS. 8D and 8E. Removal of the crown is preferably performed by cutting, for example by linear cutting means cutting in a direction perpendicular to the longitudinal axis 4 or by rotating cutting means cutting around a cutting path along a circumferential direction around the longitudinal axis 4. The inverted fat end 48 is then discharged through a transport channel which is in fluid communication with the inner space 17.

FIG. 9A schematically depicts a side view of a section of an embodiment of a fat end processing line comprising a fat end processing device 1. The processing line comprises a conveyor 53 for conveying the fat end processing device 1 in a conveyor direction 66 along a processing trajectory comprising multiple processing stations. At each processing station, a processing step may be performed on a fat end 40. At each processing station, the carrier 2 is placed at an appropriate position with respect to the support member 3 by a movement actuator system 56 and the locking device 23 is placed in the appropriate position by a lock actuator system 65 (see FIG. 9E), such that one or more processing steps can be performed at each processing station. The carrier 2 comprises a carrier track follower 58 following a stationary carrier track 57, a rotator 61 engaging one or more stationary rotation members 60 and a locking arm track follower 62 following a stationary locking arm track 63.

The processing steps may include any or all of the following:
  Inserting the carrier 2 into the fat end 40 (see FIGS. 1D and 1E);
  Rotating the carrier 2 with the fat end 40 (see FIGS. 3D and 3E);
  Removing organs 44 from the fat end 40 (see FIGS. 4D-4G);
  Furthering the device 1 into the fat end 40 past a curve 39 in the fat end 40 (see FIGS. 5A-5D);
  Cutting the fat end 40 to a specified length (see FIGS. 6F-6G);
  Trimming fatty tissue 51 from the fat end 40 (see FIG. 6H);
  Inverting the fat end 40 (see FIGS. 7D and 7E);
  Removing the crown 42 from the fat end 40 (see FIGS. 8D and 8E).

The processing trajectory may comprise a circle or part of a circle. In such an embodiment, a carrousel arrangement may be used. A carrousel arrangement comprises a stationary frame and a carrousel frame that is rotatable around a carrousel axis. The fat end processing device 1 is connected to the carrousel frame, such that it rotates around the carrousel axis with the carrousel frame. By rotating, the carrousel frame moves the fat end processing device 1 along the stationary frame. The stationary frame comprises stationary actuation elements such as a carrier track 57 and a rotation member 60. By rotating the carrousel with respect to the stationary frame, the fat end processing device 1 is moved along the processing trajectory. At each processing station along the processing trajectory, the carrier 2 is then positioned at an appropriate position with respect to the support member 3, and the locking device 23 is placed in the appropriate position, by the interaction between the stationary actuation elements and the moving fat end processing device 1.

Such a carrousel may also be employed when the processing trajectory itself does not comprise a circle or part of a circle, but a projection of the processing trajectory does comprise a circle or part of a circle, especially when said projection is on a substantially horizontal plane.

Figure 9B:
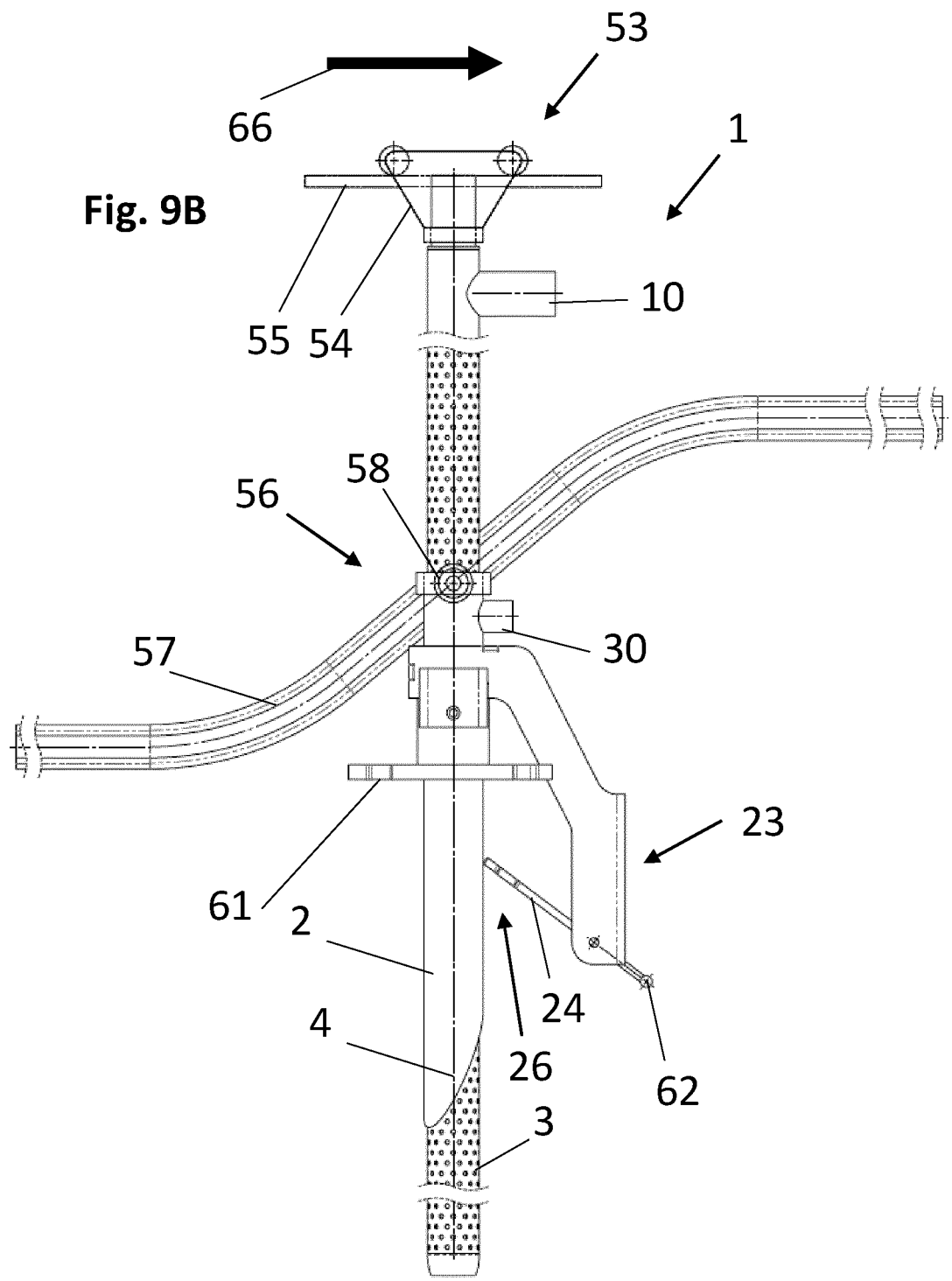
FIG. 9B schematically depicts a side view of a section of an embodiment of a fat end processing line comprising a fat end processing device according to the invention.

FIG. 9B schematically depicts a side view of an embodiment wherein the conveyor 53 comprises a transportation runner 54 that runs along a transportation rail 55. The processing trajectory along which the conveyor 53 conveys the fat end processing device 1 may have any shape, such that the layout of the processing line can be optimized for any processing plant in which the processing line is installed. In the embodiment of FIG. 9B, the shape of the processing trajectory is determined by the transportation rail 55.

The movement actuator system 56 is provided to move the carrier 2 with respect to the support member 3 in a direction parallel to the longitudinal axis 4 of the support member 3. The movement actuator system 56 comprises a carrier track follower 58 following a carrier track 57.

Figure 9C:
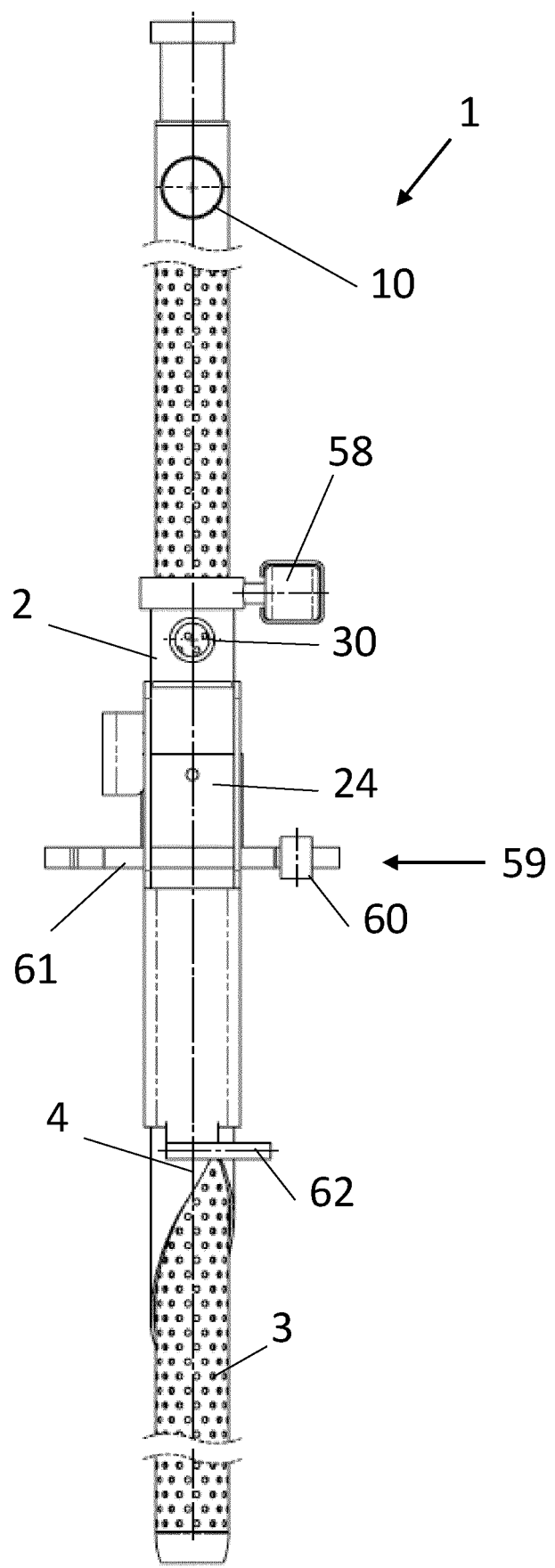
FIG. 9C schematically depicts a side view of the fat end processing line of FIG. 9A.
Figure 9D:
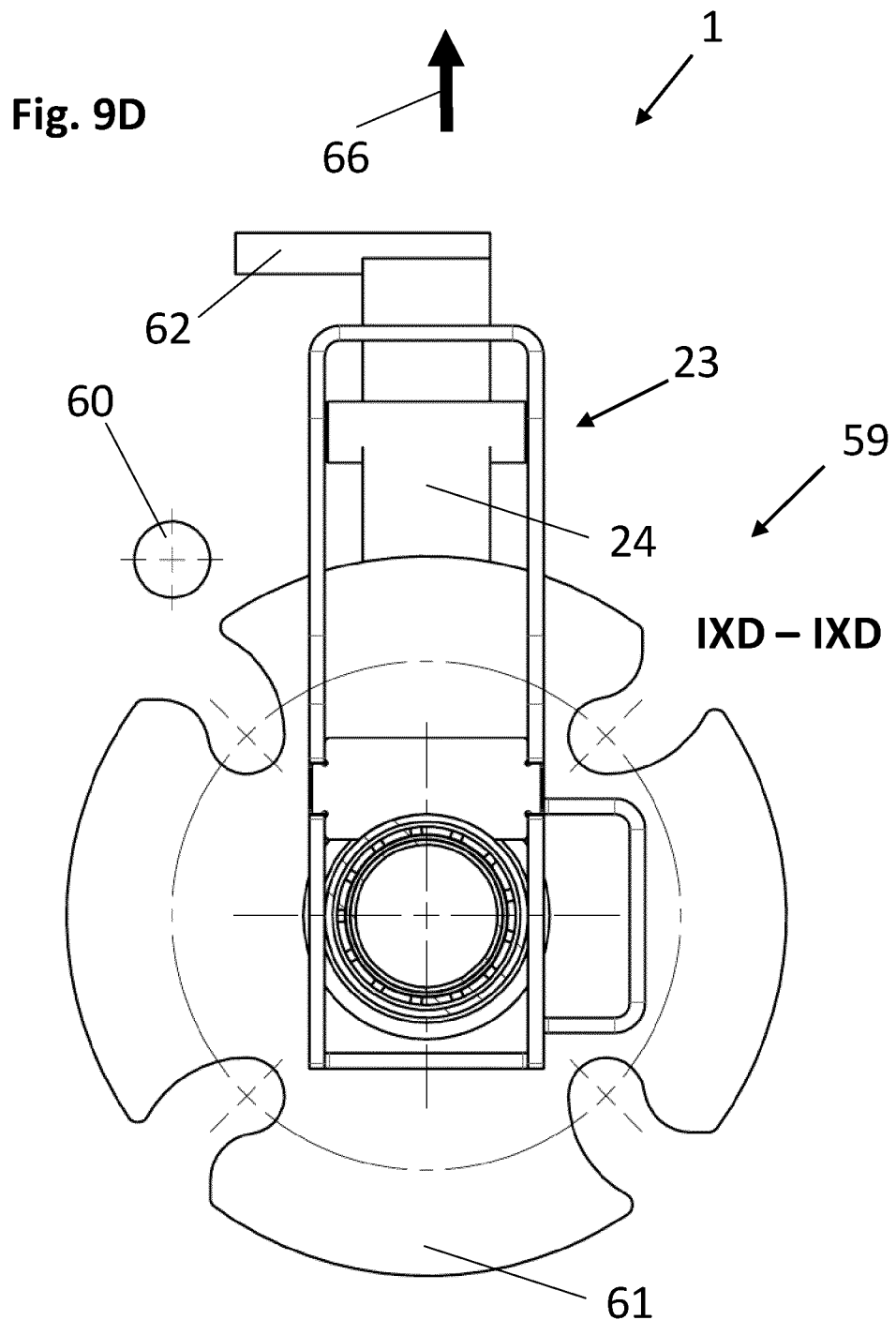
FIG. 9D schematically depicts a top view of a cross section of the fat end processing line of FIG. 9A, wherein the cross-section is indicated in FIG. 9A by dash-dotted line IXD-IXD.

FIG. 9C schematically depicts a side view of the fat end processing device 1 of FIG. 9A, while FIG. 9D depicts a top view of a cross section of the fat end processing device 1 of FIG. 9A, which cross-section is indicated in FIG. 9A by dash-dotted line IXD-IXD. The fat end processing line comprises a rotation actuator system 59 configured for rotating the carrier 2 with respect to the support member 3 around the longitudinal axis 4. The rotation actuator system 59 comprises a rotator 61 connected to the carrier and a stationary rotation member 60 that is configured to engage with the rotator 61 if the fat end processing device 1 is moved past the rotation member 60 by the conveyor 53, thereby rotating the carrier 2 with respect to the support member 3.

The shape of the rotator 61 dictates the angle over which the carrier 2 rotates upon moving past the rotation member 60. Furthermore, adding multiple rotation members 60 along the processing trajectory allows rotating the carrier 2 multiple times, wherein placing a rotation member 60 on the opposite side of the processing trajectory yields a rotation in the opposite direction. In the imaged embodiment, the carrier 2 is rotated over 90 degrees upon each passing of a rotation member 60.

Figure 9E:
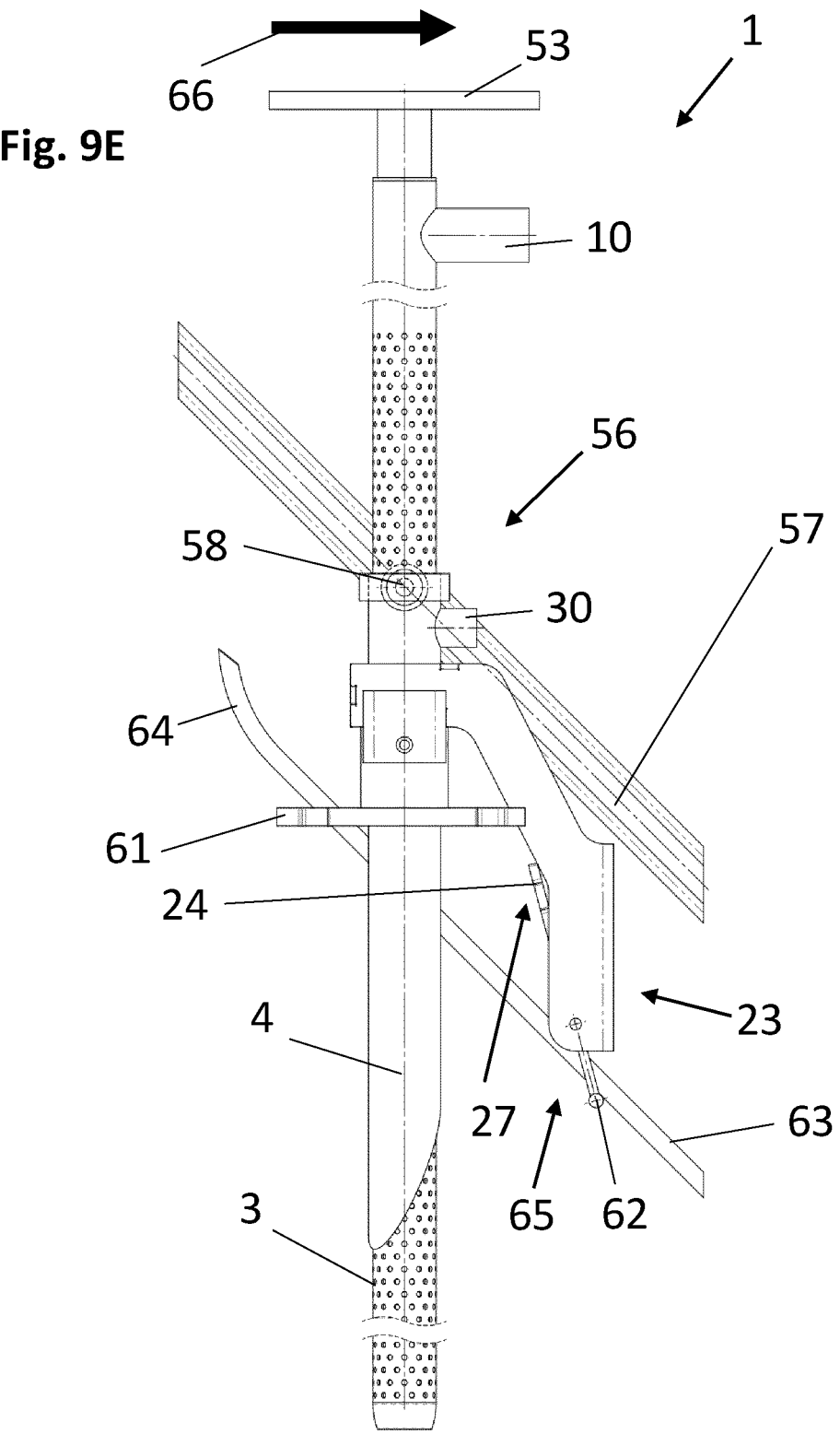
FIG. 9E schematically depicts a side view of the fat end processing line of FIG. 9A, wherein the fat end processing device is at another position along said processing line wherein the locking arm of the locking device is in the releasing position.

FIG. 9E schematically depicts a side view of the fat end processing line of FIG. 9A, wherein the fat end processing device 1 is at another position along said processing line, and wherein the locking arm 24 of the locking device 23 is in the releasing position 27. The lock actuator system 65 comprising a locking arm track follower 62 following a locking arm track 63 is provided to move the locking arm 24 from the locking position 26 to the releasing position 27. The locking arm track 63 comprises a locking arm track bend 64 to allow smooth engagement of the locking arm track follower 62 with the locking arm track 63 upon movement of the fat end processing device 1 by the conveyor 53 with respect to the locking arm track 63.

As explained in detail above, an intestinal tract part processing method and device 1 are disclosed. The device 1 comprises a carrier 2 for holding the intestinal tract part on the carrier 2 at a first end of the intestinal tract part, and an elongate support member 3 having a longitudinal axis 4, which support member 3 is configured for supporting the intestinal tract part on an inside of the intestinal tract part. The support member 3 comprises an outer wall 7 and an inner wall 8, the outer wall 7 surrounding the inner wall 8, at least one fluid chamber 9 arranged between the inner wall 8 and the outer wall 7, and a primary fluid connection 10 configured for supplying a fluid to the at least one fluid chamber 9 and/or for discharging a fluid from the at least one fluid chamber 9. A plurality of passages 11 are provided in the outer wall 7 which passages 11 provide a fluid path from the at least one fluid chamber 9 through the outer wall 7. The carrier 2 and the support member 3 are movable relative to each other in a direction parallel to the longitudinal axis 4. The carrier 2 comprises a tubular carrying member 6 which is arranged coaxially to the support member 3 on an outer side of the support member 3.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The figures and detailed description of the figures disclose processing devices, processing lines and processing methods for fat ends. The present disclosure also relates to similar processing devices, processing lines and processing methods for other intestinal tract parts. Said other intestinal tract parts may not comprise a crown, however they may be processed in a similar way and by similar processing devices and processing lines as depicted and described above.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. An intestinal tract part processing device, comprising:
    a carrier for holding the intestinal tract part on the carrier at a first end of the intestinal tract part, and
    an elongate support member having a longitudinal axis, which support member is configured for supporting the intestinal tract part on an inside of the intestinal tract part,
    wherein the support member comprises:
        an outer wall and an inner wall, the outer wall surrounding the inner wall,
        at least one fluid chamber arranged between the inner wall and the outer wall,
        a primary fluid connection configured for supplying a fluid to the at least one fluid chamber and/or for discharging a fluid from the at least one fluid chamber,
    and wherein:
        a plurality of passages are provided in the outer wall which passages provide a fluid path from the at least one fluid chamber through the outer wall,
        the carrier and the support member are movable relative to each other in a direction parallel to the longitudinal axis, and
        the carrier comprises a tubular carrying member which is arranged coaxially to the support member on an outer side of the support member.

2. The intestinal tract part processing device according to claim 1, wherein:
    the at least one fluid chamber is in fluid communication with the primary fluid connection,
    the intestinal tract part processing device comprises primary fluid control means configured to control fluid communication between the primary fluid connection and:
    a flushing fluid source for providing a flushing fluid to the at least one fluid chamber, which flushing fluid is expelled from the passages if the primary fluid control means allow fluid communication between the primary fluid connection and the flushing fluid source, and/or
a primary vacuum source for depressurizing the at least one fluid chamber to a pressure below ambient pressure if the primary fluid control means allow fluid communication between the primary fluid connection and the primary vacuum source.

3. The intestinal tract part processing device according to claim 2, wherein the flushing fluid comprises a liquid, essentially consisting of, or comprising water.

4. The intestinal tract part processing device according to claim 1, wherein the inner wall and the outer wall are coaxially arranged cylindrical walls, wherein the at least one fluid chamber is formed as an annular cylindrical chamber.

5. The intestinal tract part processing device according to claim 1, wherein:
the support member comprises an inner space which is at least partially surrounded by the inner wall,
the support member comprises an inner space entrance arranged on an axial end of the support member, and
the support member comprises a secondary fluid connection configured for discharging a fluid from the inner space.

6. The intestinal tract part processing device according to claim 5, wherein:
the inner space is in fluid communication with the secondary fluid connection,
the intestinal tract part processing device comprises secondary fluid control means configured to control fluid communication between the secondary fluid connection and a vacuum source, and
the vacuum source is configured for depressurizing the inner space to a pressure below ambient pressure if the secondary fluid control means allow fluid communication between the secondary fluid connection and the vacuum source.

7. The intestinal tract part processing device according to claim 1, wherein the carrier and the support member are rotatable relative to each other around the longitudinal axis.

8. The intestinal tract part processing device according to claim 1, wherein the support member has a substantially tubular shape.

9. The intestinal tract part processing device according to claim 1, wherein the longitudinal axis of the support member is oriented substantially vertically.

10. The intestinal tract part processing device according to claim 1, wherein the tubular carrying member comprises a bevel shaped insertion end configured for inserting into the first end of the intestinal tract part.

11. The intestinal tract part processing device according to claim 1, wherein:
the carrier comprises a locking device,
the locking device comprises a locking arm,
the locking arm has a locking end,
the locking arm is movable from a locking position to a releasing position and vice versa, and
in the locking position, the locking end is positioned closer to an outer surface of the carrying member than in the releasing position.

12. The intestinal tract part processing device according to claim 11, wherein the locking device is configured to bias the locking arm with its locking end towards the outer surface of the carrying member by gravity, a spring force, or a magnetic force.

13. The intestinal tract part processing device according to claim 1, wherein the carrier comprises a tertiary fluid connection configured for supplying a rinsing fluid to the carrier and the carrier is configured for expelling the rinsing fluid into the intestinal tract part to rinse the intestinal tract part.

14. The intestinal tract part processing device according to claim 1 comprising an engaging device, wherein:
the engaging device is movable with respect to the support member in the direction parallel to the longitudinal axis, and
the engaging device comprises engaging members configured for engaging an outer surface of the intestinal tract part supported on the support member and exerting a force on the outer surface of the intestinal tract part in the direction parallel to the longitudinal axis.

15. The intestinal tract part processing device according to claim 14, wherein the engaging members comprise two sets of engaging fingers.

16. The intestinal tract part processing device according to claim 14, wherein the engaging device comprises flexible material.

17. The intestinal tract part processing device according to claim 14, wherein at least one of the engaging members is movable with respect to at least one other engaging member.

18. The intestinal tract part processing device according to claim 1, wherein the intestinal tract part comprises a fat end.

19. The intestinal tract part processing device according to claim 18, wherein the first end of the intestinal tract part is a crown end of the fat end.

20. The intestinal tract part processing line comprising an intestinal tract part processing device according to claim 1, the processing line comprising:
a conveyor configured for transporting said intestinal tract part processing device along a processing trajectory comprising multiple processing stations, and
a movement actuator system configured for moving the carrier and the support member relative to each other in a direction parallel to the longitudinal axis of the support member.

21. The intestinal tract part processing line according to claim 20, wherein the carrier and the support member are rotatable relative to each other around the longitudinal axis, and further comprising a rotation actuator system configured for rotating the carrier and the support member relative to each other around the longitudinal axis of the support member.

22. The intestinal tract part processing line according to claim 20,
wherein the carrier comprises a locking device,
wherein the locking device comprises a locking arm,
wherein the locking arm has a locking end,
wherein the locking arm is movable from a locking position to a releasing position and vice versa, and
wherein in the locking position, the locking end is positioned closer to an outer surface of the carrying member than in the releasing position, and
further comprising a lock actuator system configured for moving the locking arm from the locking position to the releasing position and/or from the releasing position to the locking position.

23. A method of processing an intestinal tract part, the method comprising the steps of:
providing a carrier for holding the intestinal tract part,
providing an elongate support member configured for supporting the intestinal tract part on the inside of the intestinal tract part, wherein the support member comprises:
an outer wall and an inner wall, the outer wall surrounding the inner wall, at least one fluid chamber arranged between the inner wall and the outer wall,
a primary fluid connection configured for supplying a fluid to the at least one fluid chamber and/or for discharging a fluid from the at least one fluid chamber,
a plurality of passages provided in the outer wall which passages provide a fluid path from the at least one fluid chamber through the outer wall,
fixing the intestinal tract part on the carrier on a first end of the intestinal tract part, and
moving the carrier and the support member with respect to each other in a direction parallel to a longitudinal axis of the support member, thereby inserting the support member at least partially into the intestinal tract part.

24. The method according to claim 23, wherein the method comprises the step of rotating the carrier with the intestinal tract part arranged thereon with respect to the support member.

25. The method according to claim 24, wherein the step of rotating the carrier is performed before inserting the support member into the intestinal tract part.

26. The method according to claim 23, wherein the method comprises the step of, after fixing the intestinal tract part on the carrier, removing a connected organ from the intestinal tract part by pulling and/or cutting said organ away from the intestinal tract part.

27. The method according to claim 26, wherein the step of removing a connected organ from the intestinal tract part comprises the step of pulling said organ away from the intestinal tract part and subsequently severing tissue connecting the organ to the intestinal tract part.

28. The method according to claim 23, wherein the method comprises the step of, after inserting the support member at least partially into the intestinal tract part such that the support member supports an engaged portion of the intestinal tract part, engaging an outer surface of the engaged portion of the intestinal tract part using an engaging member and subsequently moving the engaged portion with respect to the support member in the direction parallel to the longitudinal axis of the support member by moving the engaging member engaging the engaged portion with respect to the support member, thereby sliding the engaged portion of the intestinal tract part over the support member, such that the support member is inserted further into the intestinal tract part.

29. The method according to claim 23, wherein the method comprises the step of, after fixing the intestinal tract part on the carrier, expelling rinsing fluid into the intestinal tract part from the carrier to rinse the intestinal tract part.

30. The method according to claim 23, wherein the method comprises the step of, after inserting the support member into the intestinal tract part, expelling flushing fluid from the plurality of passages in the outer wall of the support member facing an inner surface of the intestinal tract part to flush an inside of the intestinal tract part.

31. The method according to claim 24, wherein the method comprises the step of, after insertion of the support member into the intestinal tract part, fixing the intestinal tract part against the support member by depressurizing the passages in the outer wall of the support member facing an inner surface of the intestinal tract part to a pressure below ambient pressure.

32. The method according to claim 23, wherein the method comprises the step of, after fixing the intestinal tract part against the support member, removing tissue connected to an outer surface of the intestinal tract part from the intestinal tract part by pulling and/or cutting said tissue away from the intestinal tract part.

33. The method according to claim 32, wherein the step of removing tissue connected to the outer surface of the intestinal tract part is performed by tensioning said tissue by applying a suction force to said tissue using a suction device and subsequently cutting the tensioned tissue free from the intestinal tract part.

34. The method according to claim 23, wherein the method comprises the step of, after fixing the intestinal tract part against the support member, detaching the intestinal tract part from the support member by pressurizing the fluid chamber which is in fluid communication with the passages in the outer wall of the support member facing the inner surface of the intestinal tract part to a pressure above ambient pressure.

35. The method according to claim 23, wherein the method comprises the step of, after fixing the intestinal tract part against the support member, detaching the intestinal tract part from the support member by expelling rinsing fluid into the intestinal tract part from the carrier.

36. The method according to claim 23, wherein the method comprises the step of cutting a discarding section from the intestinal tract part.

37. The method according to claim 23, wherein the method comprises the step of, after insertion of the support member into the intestinal tract part, inverting the intestinal tract part by sucking the intestinal tract part into an inner space of the support member through an inner space entrance by creating a pressure below ambient pressure in the inner space.

38. The method according to claim 37, wherein the step of inverting the intestinal tract part comprises:
preventing the first end of the intestinal tract part from being sucked into the inner space by providing the inner space entrance with an opening allowing an intestinal tract part body to enter the inner space while preventing the first end of the intestinal tract part from entering the inner space, and
subsequently removing the first end of the intestinal tract part from the intestinal tract part.

39. The method according to claim 37, wherein the step of inverting the intestinal tract part is performed after the step of cutting a discarding section from the intestinal tract part.

40. The method according to claim 37, wherein the method comprises the step of, after inversion of the intestinal tract part, discharging the inverted intestinal tract part through a transport channel which is in fluid communication with the inner space.

41. The method according to claim 23, wherein the method comprises the step of moving the carrier and the support member along a processing trajectory comprising multiple processing stations.

42. The method according to claim 23, wherein the intestinal tract part is a fat end.

43. The method according to claim 42, wherein the first end of the intestinal tract part is a crown end of the fat end.

44. An elongate support member for use in an intestinal tract part processing device according to claim 1, wherein the elongate support member comprises:
an outer wall and an inner wall surrounding a longitudinal axis, the outer wall surrounding the inner wall,
an inner space surrounded by the inner wall,
an inner space entrance arranged at an axial end of the elongate support member, at least one fluid chamber arranged between the inner wall and the outer wall, a primary fluid connection configured for supplying a fluid to the at least one fluid chamber and/or for discharging a fluid from the at least one fluid chamber, and a plurality of passages provided in the outer wall which passages provide a fluid path from the at least one fluid chamber through the outer wall.

* * * * *